(12) United States Patent
Vanderveen

(10) Patent No.: US 10,085,148 B2
(45) Date of Patent: *Sep. 25, 2018

(54) METHOD AND APPARATUS FOR NEW KEY DERIVATION UPON HANDOFF IN WIRELESS NETWORKS

(71) Applicant: QUALCOMM Incorporated, San Diego, CA (US)

(72) Inventor: Michaela Vanderveen, Tracy, CA (US)

(73) Assignee: QUALCOMM Incorporate, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,636

(22) Filed: Aug. 9, 2017

(65) Prior Publication Data

US 2017/0339558 A1 Nov. 23, 2017

Related U.S. Application Data

(63) Continuation of application No. 12/109,082, filed on Apr. 24, 2008.

(Continued)

(51) Int. Cl.
*H04W 36/00* (2009.01)
*H04W 12/04* (2009.01)
(Continued)

(52) U.S. Cl.
CPC ............. *H04W 12/04* (2013.01); *H04L 9/083* (2013.01); *H04L 9/0841* (2013.01);
(Continued)

(58) Field of Classification Search
CPC ............. H04W 36/00; H04W 36/0016; H04W 36/0038
See application file for complete search history.

(56) References Cited

U.S. PATENT DOCUMENTS 4,933,971 A 6/1990 Bestock et al.
7,236,477 B2 6/2007 Emeott et al.
(Continued)

FOREIGN PATENT DOCUMENTS

EP 1439667 A2 7/2004
JP 03034641 2/1991
(Continued)

OTHER PUBLICATIONS

European Search Report—EP10001502—Search Authority—The Hague—dated Sep. 6, 2013.

(Continued)

*Primary Examiner* — Ellen Tran
(74) *Attorney, Agent, or Firm* — Jae-Hee Choi; Arent Fox

(57) ABSTRACT

A novel key management approach is provided for securing communication handoffs between an access terminal and two access points. An access terminal establishes a secure communication session with a first access point based on a first master session key based on a master transient key. The access terminal obtains a second access point identifier associated with a second access point and sends a message associated with a handoff to either the first access point or the second access point. The access terminal generates a second master session key based on at least the master transient key and the second access point identifier. The second master session key is used for secure communications with the second access point in connection with an intra-authenticator handoff from the first access point to the second access point. The access terminal then moves the secure communication session to the second access point.

32 Claims, 14 Drawing Sheets

Related U.S. Application Data

(60) Provisional application No. 60/914,033, filed on Apr. 26, 2007.

(51) Int. Cl.
  *H04L 9/08* (2006.01)
  *H04W 76/10* (2018.01)
  *H04W 8/26* (2009.01)
  *H04W 36/08* (2009.01)
  *H04W 74/00* (2009.01)
  *H04W 88/08* (2009.01)
  *H04W 92/10* (2009.01)

(52) U.S. Cl.
  CPC .... *H04L 2209/80* (2013.01); *H04L 2463/061* (2013.01); *H04W 8/26* (2013.01); *H04W 36/08* (2013.01); *H04W 74/004* (2013.01); *H04W 76/10* (2018.02); *H04W 88/08* (2013.01); *H04W 92/10* (2013.01)

(56) References Cited

U.S. PATENT DOCUMENTS

| | | | |
|---|---|---|---|
| 2003/0226017 A1* | 12/2003 | Palekar | H04L 63/0428 713/168 |
| 2004/0103282 A1 | 5/2004 | Meier et al. | |
| 2004/0236939 A1 | 11/2004 | Watanabe et al. | |
| 2004/0242228 A1 | 12/2004 | Lee et al. | |
| 2005/0030924 A1 | 2/2005 | Yano et al. | |
| 2005/0143065 A1 | 6/2005 | Pathan et al. | |
| 2006/0121883 A1 | 6/2006 | Faccin | |
| 2006/0233376 A1 | 10/2006 | Forsberg et al. | |
| 2006/0256763 A1 | 11/2006 | Nguyen et al. | |
| 2007/0003062 A1 | 1/2007 | Mizikovsky et al. | |
| 2007/0060127 A1 | 3/2007 | Forsberg | |
| 2007/0110009 A1 | 5/2007 | Bachmann et al. | |
| 2007/0153739 A1 | 7/2007 | Zheng | |
| 2007/0206537 A1 | 9/2007 | Cam-Winget et al. | |
| 2008/0070577 A1 | 3/2008 | Narayanan et al. | |
| 2008/0267407 A1 | 10/2008 | Vanderveen | |

FOREIGN PATENT DOCUMENTS

| | | |
|---|---|---|
| JP | 2004222300 A | 8/2004 |
| JP | 2008529413 A | 7/2008 |
| JP | 2008545337 A | 12/2008 |
| RU | 2005118424 A | 1/2006 |
| RU | 2297037 C2 | 4/2007 |
| TW | 200637323 A | 10/2006 |
| WO | 0182038 A2 | 11/2001 |
| WO | 03092218 A1 | 11/2003 |
| WO | 2004046898 A1 | 6/2004 |
| WO | 2006081122 A2 | 8/2006 |
| WO | 2007000179 A1 | 1/2007 |
| WO | 2007005309 A1 | 1/2007 |
| WO | 2008024999 A1 | 2/2008 |

OTHER PUBLICATIONS

International Search Report and Written Opinion—PCT/US2008/061645—ISA/EPO—dated Oct. 10, 2008.

Proactive Key Distribution Using Neighbor Graphs by Arunesh Mishra, Min Ho Shin, Nick L. Petroni, Jr. T. Charles Clancy, and William A. Arbaugh, University of Maryland—IEEE wireless Communications pp. 25 through 36—Feb. 2004.

Taiwan Search Report—TW097115441—TIPO—dated Apr. 16, 2012.

* cited by examiner

METHOD AND APPARATUS FOR NEW KEY DERIVATION UPON HANDOFF IN WIRELESS NETWORKS

CROSS-REFERENCE TO RELATED APPLICATIONS

The present application for patent is a continuation of U.S. application Ser. No. 12/109,082 entitled "A Method and Apparatus for New Key Derivation upon Handoff in Wireless Networks," filed Apr. 24, 2008, which claims the benefit of U.S. Provisional Application No. 60/914,033 entitled "A Method and Apparatus for New Key Derivation upon Handoff in Wireless Networks," filed Apr. 26, 2007 and assigned to the assignee hereof, the entire contents of each of which are hereby expressly incorporated by reference herein.

BACKGROUND

Field

Various features pertain to wireless communication systems. At least one aspect pertains to a system and method for key management for network access with low latency.

Background

Wireless communication networks enable communication devices to transmit and/or receive information while on the move. These wireless communication networks may be communicatively coupled to other public or private networks to enable the transfer of information to and from the mobile access terminal. Such communication networks typically include a plurality of access points (e.g., base stations) which provide wireless communication links to access terminals (e.g., mobile communication devices, mobile phones, wireless user terminals). The access points may be stationary (e.g., fixed to the ground) or mobile (e.g., mounted on satellites, etc.) and positioned to provide wide area coverage as the access terminal travels across different coverage areas.

As a mobile access terminal moves around, its communication link with an access node may degrade. In this situation, the mobile node may switch or connect with another access point for a better quality communication link while its first link is still active. This process of establishing a communication link with another access point is referred to as a "handoff". The handoff process typically faces the problem of maintaining a reliable and secure communication link with the wireless communication network while switching access points. Soft handoffs and hard handoffs are two commonly used types of handoffs. A soft handoff is one where a new communication link with a new access point is established before the existing communication link is terminated. In a hard handoff, an existing communication link is typically terminated before a new communication link is established.

In some communication systems, when a mobile access terminal attaches to a communication network through an access point, it performs network access authentication to establish a secure master key. Each time a handoff occurs, this process may be repeated. However, repeating this authentication process at each handoff introduces an unacceptable latency. One current solution to reduce this latency is to share the master key among the access points. However, this approach creates a serious security risk if an access point is compromised since the master key becomes unsecured and can be used to compromise all communications in which that master key is used.

Consequently, a method is needed that provides a low-latency handoff between an access terminal and access points without compromising security.

SUMMARY

One feature provides a system and method for key management between an access terminal (e.g., mobile terminal, wireless user terminal, etc.) and one or more access points (e.g., base stations, etc.). In particular, a scheme is provided for establishing secure communications between an access terminal and access point without risking exposure a master key for the access terminal. This approach derives master session keys for low latency handoffs and secure authentication between a new access point and the access terminal.

In one aspect, a centralized key management scheme is provided in which an authenticator maintains, generates, and distributes new security keys to access points. As an access terminal moves from a current access point to a new access point, the authenticator generates a new security key or master session key (MSK) based on a master transient key (MSK), an access point identifier and an access terminal identifier. The new master session key is then sent to the new access point. The authenticator repeats this process as the access terminal switches to other access points. The access terminal independently generates the same new security key with which it can securely communicate with the new access points.

In another aspect, the access point may have an associated value which is sent to the authenticator in the key request that also includes the access point identifier and access terminal identifier. The associated value of the access point may be used, in addition to the master transient key, access point identifier and access terminal identifier, to generate the master session key.

In yet another aspect, the authenticator may have an associated value which may be used, in addition to the master transient key, access point identifier and access terminal identifier, to generate the master session key.

An access point is provided comprising a memory and a processor. The processor may be configured to (a) receive a first request from an access terminal to establish a secure communication session via the access point; (b) send a key request message to an authenticator, wherein the key request message includes a locally obtained first access point identifier and a received access terminal identifier; and/or (c) receive a first master session key from the authenticator for establishing the communication session between the access terminal and the access point, wherein the first master session key is a function of at least the first access point identifier and the access terminal identifier.

The processor may be further configured to (a) receive a handoff request from the access terminal to handoff the secure communication session to a second access point, wherein the request includes a second access point identifier associated with a second access point to which the communication session is to be handed off; (b) send the second access point identifier and the received access terminal identifier to the second access point; (c) hand off the communication session to the second access point; and/or (d) generate a transient session key as a function of the first master session key, wherein the transient session key is used to establish the communication session between the access terminal and the access point.

In another aspect, the key request message may also include a first value generated by or associated with the access point, and where the first master session key is also a function of the associated value. The associated value is also sent to the access terminal to allow the access terminal to generate the first master session key. The associated value may be an Internet Protocol (IP) or Medium Access Control (MAC) address of the access point. Alternatively, the received first master session key is also a function of an associated value generated by the authenticator, and the access point receives the associated value from the authenticator.

A method is also provided for (a) receiving a first request from an access terminal to establish a secure communication session via the access point; (b) sending a key request message to an authenticator, wherein the key request message includes a locally obtained first access point identifier and a received access terminal identifier; and/or (c) receiving a first master session key from the authenticator for establishing the communication session between the access terminal and the access point, wherein the first master session key is a function of at least the first access point identifier and the access terminal identifier.

The method may further comprise (a) receiving a handoff request from the access terminal to handoff the secure communication session to a second access point, wherein the request includes a second access point identifier associated with a second access point to which the communication session is to be handed off; (b) sending the second access point identifier and the received access terminal identifier to the second access point; and/or (c) handing off the communication session to the second access point.

In another embodiment, the key request message also includes a first value generated by or associated with the access point, and the first master session key is also a function of the value. The first value may include an Internet Protocol (IP) or Medium Access Control (MAC) address of the access point. In yet another embodiment, the key request message also includes a first value generated by the authenticator, and the first master session key is also a function of the first value.

Consequently, an access point is provided comprising: (a) means for receiving a first request from an access terminal to establish a secure communication session via the access point; (b) means for sending a key request message to an authenticator, wherein the key request message includes a locally obtained first access point identifier and a received access terminal identifier; and (c) means for receiving a first master session key from the authenticator for establishing the communication session between the access terminal and the access point, wherein the first master session key is a function of at least the first access point identifier and the access terminal identifier.

The apparatus may further comprise (a) means for receiving a handoff request from the access terminal to handoff the secure communication session to a second access point, wherein the request includes a second access point identifier associated with a second access point to which the communication session is to be handed off; (b) means for sending the second access point identifier and the received access terminal identifier to the second access point; and/or (c) means for handing off the communication session to the second access point.

A processor readable medium comprising instructions that may be used by one or more processors, the instructions comprising: (a) instructions for receiving a first request from an access terminal to establish a secure communication session via the access point; (b) instructions for sending a key request message to an authenticator, wherein the key request message includes a locally obtained first access point identifier and a received access terminal identifier; (c) instructions for receiving a first master session key from the authenticator for establishing the communication session between the access terminal and the access point, wherein the first master session key is a function of at least the first access point identifier and the access terminal identifier; (d) instructions for receiving a handoff request from the access terminal to handoff the secure communication session to a second access point, wherein the request includes a second access point identifier associated with a second access point to which the communication session is to be handed off; (e) instructions for sending the second access point identifier and the received access terminal identifier to the second access point; and/or (f) instructions for handing off the communication session to the second access point.

A processor is also provided comprising: a processing circuit configured to (a) receive a first request from an access terminal to establish a secure communication session via the access point; (b) send a key request message to an authenticator, wherein the key request message includes a locally obtained first access point identifier and a received access terminal identifier; (c) receive a first master session key from the authenticator for establishing the communication session between the access terminal and the access point, wherein the first master session key is a function of at least the first access point identifier and the access terminal identifier (d) receive a handoff request from the access terminal to handoff the secure communication session to a second access point, wherein the request includes a second access point identifier associated with a second access point to which the communication session is to be handed off; (e) send the second access point identifier and the received access terminal identifier to the second access point; and/or (f) handoff the communication session to the second access point.

An access terminal is provided comprising a memory and a processor. The processor may be configured to (a) establish a master transient key with an authenticator based on at least a top-level master key associated with the access terminal; (b) obtain an access point identifier associated with a first access point; (c) send a request to the first access point to establish a secure communication session; (d) generate a first master session key as a function of at least the master transient key and the first access point identifier; and/or (e) establish the secure communication session with the first access point using the first master session key. The process may be further configured to: (a) obtain a second access point identifier associated with a second access point; (b) send a non-specific handoff request to the second access point to handoff the secure communication session to the second access point; (c) generate a second master session key using at least the master transient key and the second access point identifier; and/or (d) handoff the secure communication session to the second access point using the second master session key. The access terminal may be further configured to receive a first associated value generated by the first access point, wherein the first master session key is also a function of the first associated value. In one example, the first associated value may include at least one of an Internet Protocol (IP) or Medium Access Control (MAC) address of the first access point, and the first master session key may also be a function of the IP or the MAC address.

A method is also provided comprising: (a) establishing a master transient key with an authenticator based on at least a top-level master key associated with the access terminal; (b) obtaining an access point identifier associated with a first access point; (c) sending a request to the first access point to establish a secure communication session; (d) generating a first master session key as a function of at least the master transient key and the first access point identifier; and/or (e) establishing the secure communication session with the first access point using the first master session key. The method may further provide for: (a) obtaining a second access point identifier associated with a second access point; (b) sending a non-specific handoff request to the second access point to handoff the secure communication session to the second access point; (c) generating a second master session key using at least the master transient key and the second access point identifier; and/or (d) handing off the secure communication session to the second access point using the second master session key. The method may also include receiving a first associated value generated by the first access point, wherein the first master session key is also a function of the first associated value. In one example, the first associated value may include at least one of an Internet Protocol (IP) or Medium Access Control (MAC) address of the first access point, and the first master session key may also be a function of the IP or the MAC address.

Consequently, an access terminal is provided comprising: (a) means for establish a master transient key with an authenticator based on at least a top-level master key associated with the access terminal; (b) means for obtain an access point identifier associated with a first access point; (c) means for send a request to the first access point to establish a secure communication session; (d) means for generate a first master session key as a function of at least the master transient key and the first access point identifier; and/or (e) means for establish the secure communication session with the first access point using the first master session key. The access terminal may further comprise: (a) means for obtaining a second access point identifier associated with a second access point; (b) means for sending a non-specific handoff request to the second access point to handoff the secure communication session to the second access point; (c) means for generating a second master session key using at least the master transient key and the second access point identifier; and/or (d) means for handing off the secure communication session to the second access point using the second master session key.

A processor readable medium is also provided comprising instructions that may be used by one or more processors, the instructions comprising: (a) instructions for instructions for establishing a master transient key with an authenticator based on at least a top-level master key associated with the access terminal; (b) instructions for obtaining an access point identifier associated with a first access point; (c) instructions for sending a request to the first access point to establish a secure communication session; (d) instructions for generating a first master session key as a function of at least the master transient key and the first access point identifier; (e) instructions for establishing the secure communication session with the first access point using the first master session key; (f) instructions for obtaining a second access point identifier associated with a second access point; (g) instructions for generating a second master session key using at least the master transient key and the second access point identifier; and; and/or (h) instructions for handing off the secure communication session to the second access point using the second master session key.

A processor is also provided comprising a processing circuit configured to (a) establish a master transient key with an authenticator based on at least a top-level master key associated with the access terminal; (b) obtain an access point identifier associated with a first access point; (c) send a request to the first access point to establish a secure communication session; (d) generate a first master session key as a function of at least the master transient key and the first access point identifier; (e) establish the secure communication session with the first access point using the first master session key; (f) obtain a second access point identifier associated with a second access point; (g) generate a second master session key using at least the master transient key and the second access point identifier; and/or (h) hand off the secure communication session to the second access point using the second master session key.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

Figure 1:
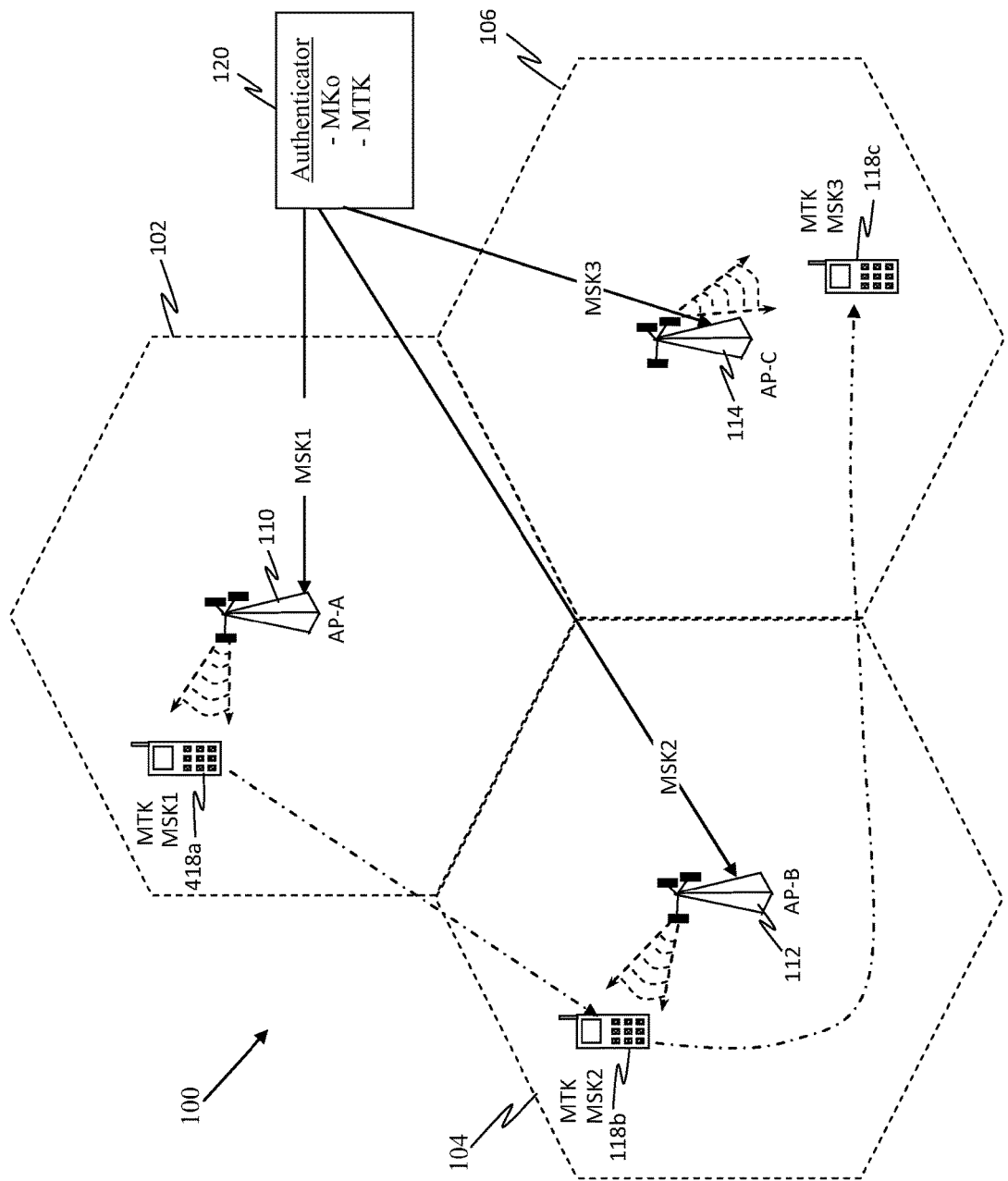
FIG. 1 illustrates a wireless communication system with centralized key management that facilitates secure, low-latency handoffs.

In the following description, specific details are given to provide a thorough understanding of the embodiments.

However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One feature provides a system and method for key management between an access terminal (e.g., mobile terminal, wireless user terminal, etc.) and one or more access points (e.g., base stations, etc.). In particular, a scheme is provided for establishing secure communications between an access terminal and access point without risking exposure a master key for the access terminal. This approach derives master session keys for low latency handoffs and secure authentication between a new access point and the access terminal.

In one aspect, a centralized key management scheme is provided in which an authenticator maintains, generates, and distributes new security keys to access points. As an access terminal moves from a current access point to a new access point, the access terminal sends a short handoff request to the new access point. The short handoff request may include the access terminal ID; it does not include the access point ID. The new access point may then send its identifier and the access terminal's identifier to the authenticator. Using a previously generated master transient key, the access point identifier (e.g. cell identifier or cell ID) and the access terminal identifier, the authenticator may generate a master session key (MSK). The master session key may then be sent to the access point. The authenticator repeats this process as the access terminal switches to other access points. The access terminal independently generates the same new security key with which it can securely communicate with the new access points.

In an alternative embodiment, the access point may have an associated value which is sent to the authenticator in the key request that also includes the access point identifier and access terminal identifier. The value of the access point may be used, in addition to the master transient key, access point identifier and access terminal identifier, to generate the master session key.

In an alternative embodiment, the authenticator may have an associated value which may be used, in addition to the master transient key, access point identifier and access terminal identifier, to generate the master session key.

So that the access terminal may generate the same master session key, the access terminal may find out the associated value via various means, such as a direct or indirect (via another access point) query to the access point in question, to the authenticator, or to another access point, or from information being broadcast by the authenticator or access point in question.

Yet another feature provides an access terminal that is configured to establish and/or maintain an active set of access points with which it can communicate. Rather than obtaining or negotiating new keys when an access terminal moves to a new access point, an active set of keys is maintained by the access terminal. That is, the access terminal may simultaneously or concurrently maintain or establish security associations (e.g., keys) with a plurality of access points within a sector, area, or region. The pre-established security keys may be subsequently employed by the access terminal to communicate with the access points in its active set without the need of reestablishing a secure relationship between itself and the access points.

In some aspects, each access terminal may be in communication with two or more sectors of one or more cells. This may be done in order to allow handoff between different sectors or cells as an access terminal moves or travels, for proper capacity management, and/or for other reasons.

As used herein, an access point may be a fixed station used for communicating with the access terminals and may also be referred to as, and include some or all the functionality of, a base station, a Node B, or some other terminology. An access terminal may also be referred to as, and include some or all the functionality of, a user equipment (UE), a wireless communication device, terminal, mobile terminal, a mobile station or some other terminology.

The transmission techniques described herein may also be used for various wireless communication systems such as a CDMA system, a TDMA system, an FDMA system, an orthogonal frequency division multiple access (OFDMA) system, a single carrier FDMA (SC-FDMA) system, and so on. An OFDMA system utilizes orthogonal frequency division multiplexing (OFDM), which is a modulation technique that partitions the overall system bandwidth into multiple (K) orthogonal subcarriers. These subcarriers are also called tones, bins, and so on. With OFDM, each subcarrier may be independently modulated with data. An SC-FDMA system may utilize interleaved FDMA (IFDMA) to transmit on subcarriers that are distributed across the system bandwidth, localized FDMA (LFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

Some of the examples described herein refer to an extensible authentication protocol (EAP) that result in the derivation of a pair-wise master key MK at an access point and an access terminal. The EAP authentication may be done between the access terminal and an authentication server (e.g., in a network controller, AAA server, etc.) via the access point acting as an authenticator; the authenticator may itself act an authentication server in some cases. In some instances, the authenticator may be co-located with one or more access points.

A Master Session Key (MSK) is established and maintained between an access point and an access terminal. The MSK may be calculated (e.g., based on the master key MK, or MK for EAP applications) to secure communications between the access terminal and the access point. For example, the MSK may be calculated as follows: MSKn=PRF (MKn, Data), where PRF is a pseudo-random function (e.g. KDF (key derive function) or Hash (function)) such as HMAC-SHA-256 or AES-128-CMAC or another key derivation function and Data may be an access point identifier and an access terminal identifier. In another embodiment, the Data may further include a particular value. The value may include an Internet Protocol (IP) or Medium Access Control (MAC) address associated with or assigned to an access point, a nonce or random number chosen by the access point, a nonce chosen by the authenticator or even a static string. The Data parameters may be known according to system design or may be communicated during the session. In this approach, no dynamic variables are used in MSK derivation and hence, no key exchange is needed beyond EAP or EAP re-authentication.

Oftentimes, a communication session between an access point and an access terminal uses some type of encryption to protect the data during transmission. However, during handoff of communications from a current access point to a new access point, there is a problem as how to continue secured communications with the new access point without compromising the communication session by transmitting the key between access points or other encryption key generation values over the air. Since a new master session key (MSK) should be established with the new access point, a new master key (MK) should be established first between the new access point and the access terminal. Additionally, it would be preferable to avoid session key sharing among access points since this introduces a vulnerability where compromise of an access point results in compromise of access points which engaged in key sharing with the compromised access point. However, negotiating the new master session key in the critical path of the handoff increases handoff latency. Hence, it would be desirable to provide a secure, low-latency session key for each access point and access terminal pair.

In the prior art approach, the same top-level master key (MKo) for an access terminal may be shared among all access points to secure communication sessions with the access terminal. If the top-level master key MKo is compromised at any one of the access points, it would compromise all communication sessions between the access terminal and all other access points. An advantage of using master session keys MSKs is that if one master session key MSKn is compromised at an access point, the master session keys for other access points, MSK1 . . . MSKn–1 or MSKo are not compromised. This is because each master session key is unique to a particular access terminal and access point pair.

FIG. 1 illustrates a wireless communication system with centralized key management that facilitates secure, low-latency handoffs. The multiple access wireless communication system 100 may include multiple cells, e.g. cells 102, 104, and 106. Each cell 102, 104, and 106 may include an access point 110, 112, and 114 that provides coverage to multiple sectors within the cell. The access points 110, 112, and 114 within each cell 102, 104, and 106 may provide network connection services to one or more access terminals. For example, as an access terminal 118 moves across the different cells 102, 104, 106, it may be in communication with access points 110, 112, and 114. An authenticator 120 (e.g. Mobility Management Entity (MME), Access Security Management Entity (ASME) or server) may serve to manage the operation of the access points 110, 112, and 114 and/or manage key authentication for access terminals. In some applications, the authenticator 120 may maintain top-level master keys uniquely associated with access terminals that are served by the network 100. For example, a first top-level master key MKo is known to the authenticator 120 and the access terminal 118, and is uniquely associated with the access terminal 118. In various applications, the authenticator 120 may be part of a network controller that is remote or apart from the access points 110, 112, and 114 or it may be co-located with one of the access points. Each access terminal may be in communication with two or more sectors of one or more cells. This may allow handoffs communication sessions between different sectors or cells as an access terminal 118 moves or travels, for proper capacity management, and/or for other reasons.

To enable fast handoffs, the authenticator 120 is configured to negotiate a master transient key (MTK) with the access terminal 118. For instance, when a communication session is first established, the authenticator 120 and access terminal 118 may use the top-level master key MKo to establish the master transient key (MTK) which may be a long-term key shared by the access terminal 118 and the authenticator 120. The authenticator 120 may then generate master session keys (MSKs) (e.g. Key for Evolved Node-B (K_eNB)) for the access points 110, 112, and 114 based (at least partially) on the master transient key (MTK), an access point identifier, and an access terminal identifier.

The authenticator 120 generates such an MSK based upon receiving a new key request message from an access point. The authenticator 120 may enclose the appropriate MSK in a new key response message it sends back to the requesting access point.

In an alternative embodiment, the authenticator may also use an associated value to generate the MSK. The value may be an Internet Protocol (IP) or Medium Access Control (MAC) address associated with or assigned to the access point or a nonce or random number chosen by the access point or the authenticator 120. The access terminal may find out the value used to generate the MSK via various means, such as a direct or indirect (via another access point) query to the access point in question, to the authenticator, or to another access point, or from information being broadcast by authenticator or the access point in question. In another embodiment, the value may be sent by the access point in a message that the access point may already be sending to the access terminal. In yet another embodiment, the value may be one that is broadcast by the access point with a prescribed periodicity for the benefit of access terminals that are handing off.

The master session keys (MSKs) are short-term, link-specific keys. The master session keys (MSKs) may be generated and/or distributed by the authenticator 120 all at once or as they are needed to handoff a session to a new access point. The access terminal 118 may similarly generate a new MSK every time it hands off a session to a new access point. By deriving a new access terminal-access point key upon handoff, no additional message to/from the access terminal is used.

The new-key request/response described above may be the fastest way for the authenticator to generate a new key. The access terminal 118 may securely derive this key for itself without any additional signaling between the access terminal 118 and the access point or the access terminal and the authenticator 120. As a result, a lower handoff delay may be obtained compared to an access terminal-authenticator authentication which may be done on power up, for example.

Figure 2A:
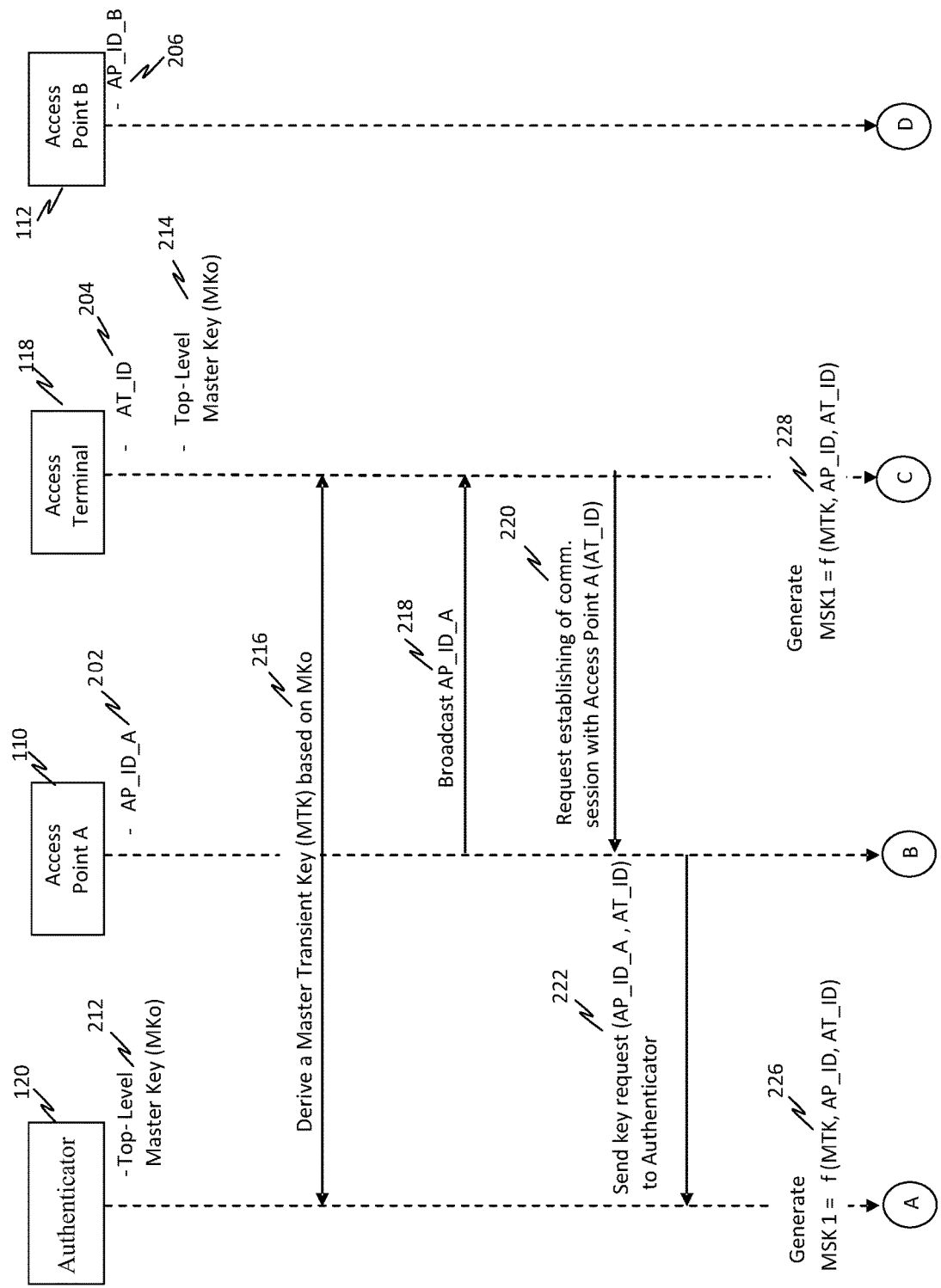
FIG. 2 (comprising FIGS. 2A, 2B and 2C) is a flow diagram illustrating a first example of the operation of a wireless communication system with centralized key management that facilitates secure, low-latency handoffs.
Figure 2B:
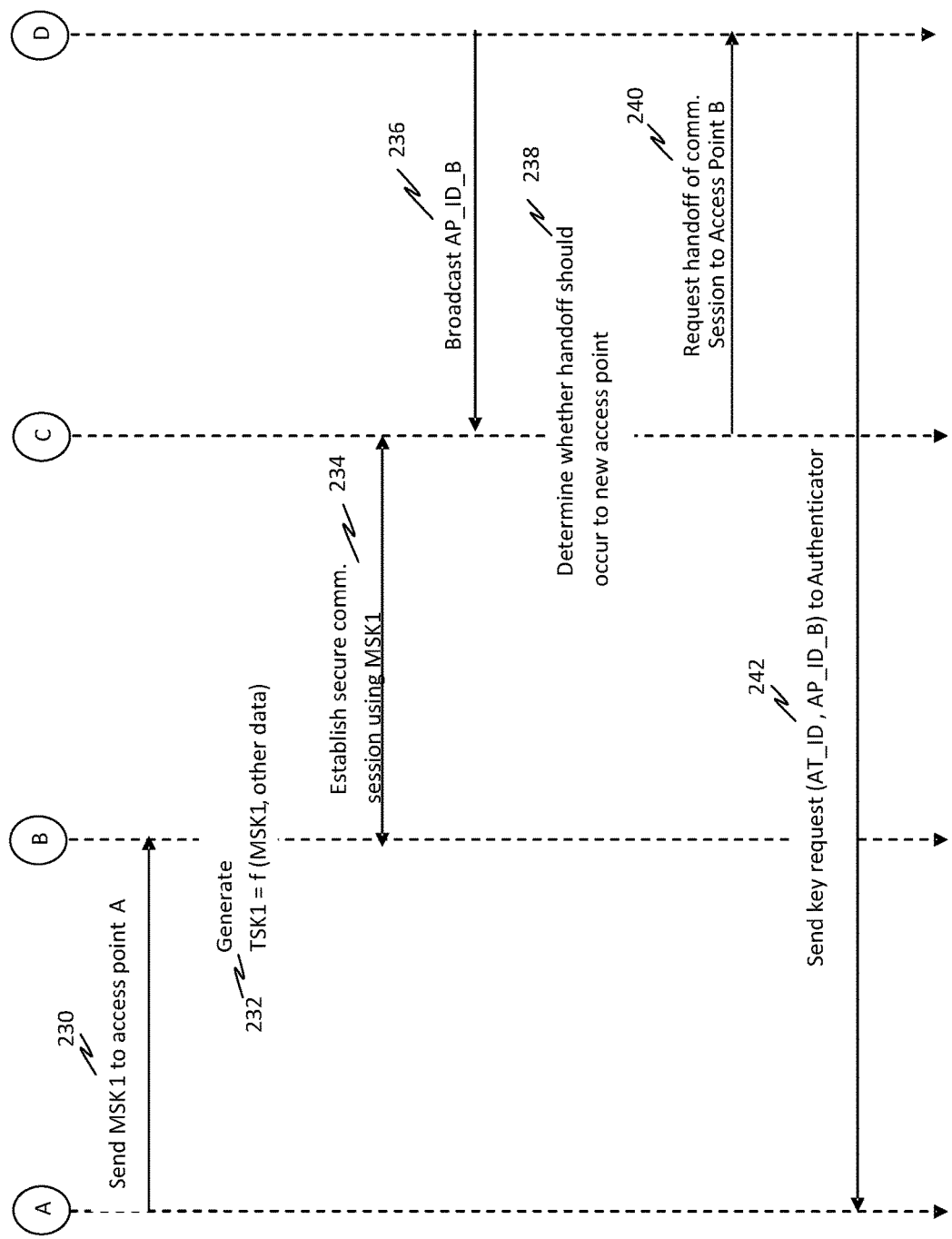
Figure 2C:
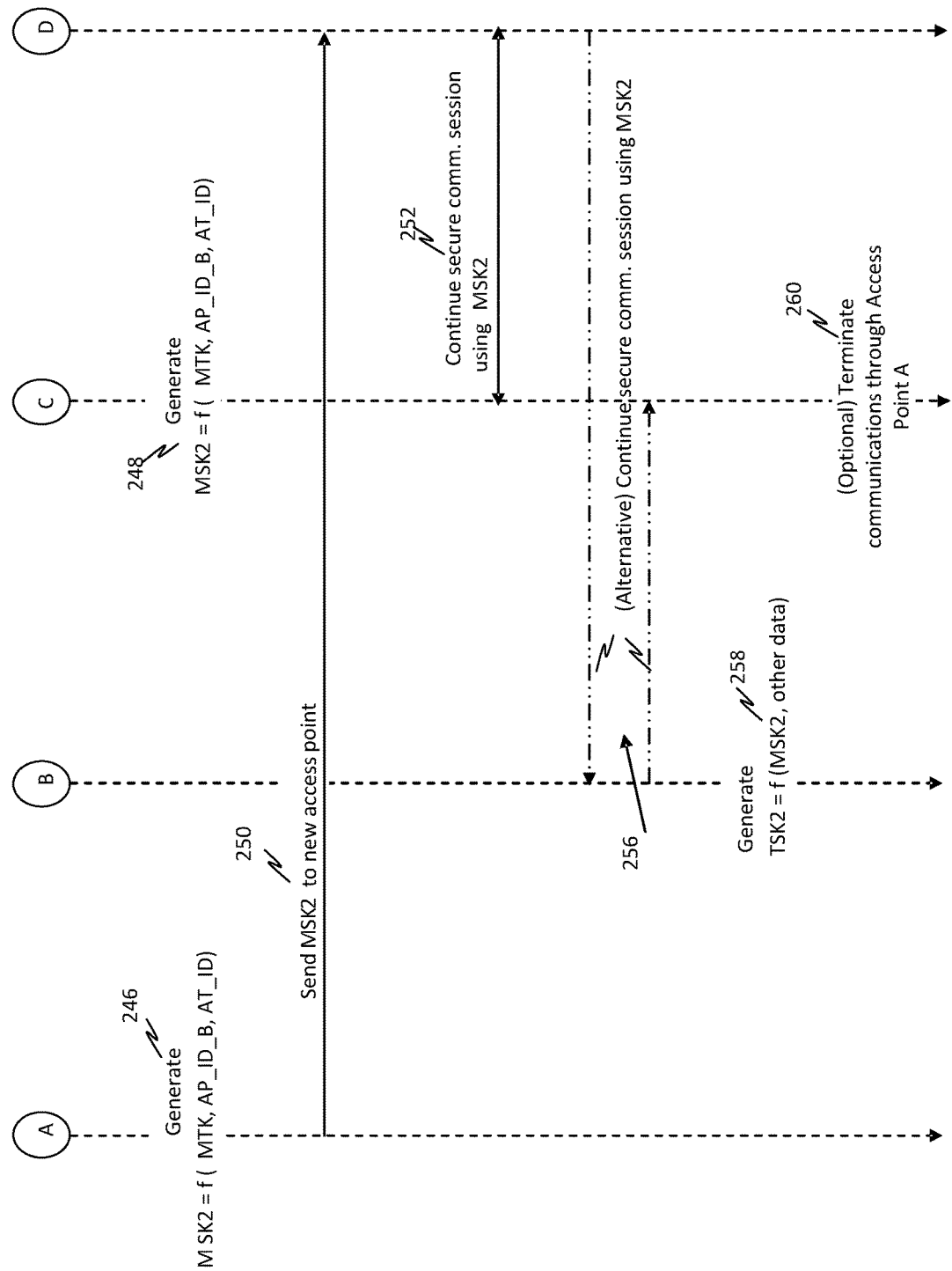

FIG. 2 (comprising FIGS. 2A, 2B and 2C) is a flow diagram illustrating a first example of the operation of a wireless communication system with centralized key management that facilitates secure, low-latency handoffs. In this first example, a master session key (MSK), as described below, may be generated based at least on a master transient key (MTK) (e.g. Key for Access Security Management Entity (K ASME) or root Master Session Key (rMSK)), an access point identifier (e.g. cell identifier or cell ID), and an access terminal identifier. Also, in this first example, the authenticator 120, access point A 110, access terminal 118, and access point B 112 of FIG. 1 are used for illustration purposes. Access point A may be identified by identifier AP_ID_A 202, access terminal may be identified by identifier AT_ID 204 and access point B may be identified by identifier AP_ID_B 206.

The authenticator 120 and access terminal 118 may each store a top-level master key MKo 212 and 214 uniquely associated with the access terminal 118. The authenticator 120 and access terminal 118 may also negotiate a master transient key (MTK) (and possibly an MTK identifier MTK_ID) via a prescribed protocol, such as EAP. The MTK may be based (at least partially) on the top-level master key MKo and/or the access terminal identifier (AT_ID) 216. The MTK may be securely maintained by the authenticator 120 and access terminal 118. In contrast, the MSK that an access terminal 118 and an access point 110 share are derived from the MTK and are master keys that may be subsequently used to derive temporary session keys.

In some implementations, the MTK derivation may also include a random number generated and/or supplied by the access terminal 118 and/or authenticator 120. As such, a protocol may be implemented between the authenticator 120 and/or access terminal 118 to derive, generate, and/or exchange such random number prior to (or concurrent with) derivation of the MTK. As it is known in the art, many instances of the EAP exhibit such an approach.

The access terminal 118 may listen for broadcasts identifying local access points for obtaining the access point identifier 218. In one example, the access terminal 118 may select an access point A 110 based on its signal strength in comparison to any other access points in the vicinity. The access terminal 118 may send a short request to establish a communication session with Access Point A 110. Unlike the prior art, the short request may not include the access point identifier (AP_ID_A), and it may include only the access terminal identifier 220. This minimizes the amount of data that is transmitted. Access point A may then send its identifier (AP_ID_A) and the access terminal identifier (AT_ID), in the form of a key request, to the authenticator for generating a first master session key (MSK1) which may be used by the access terminal and access point A (e.g. Source evolved node B (eNB)) to establish a secure communication 222.

Next, both the authenticator 120 and access terminal 118 may independently generate a first master session key MSK1 based, at least partially, on the master transient key (MTK), the access point identifier and the access terminal identifier 226 and 228. The master session keys (MSKs) may be short-term, link-specific keys. A master session key MSKn may be generated using a pseudo-random function (PRF) or other suitable key derivation function. Because the master session keys MSKs are generated using a common MTK, at least the access point identifiers AP_IDs used in the derivation of each MSK should be unique to a particular access point and access terminal pair. The authenticator 120 may then send the first master session key MSK1 to the access point A 230. Following the derivation of a first master session key (MSK1), a first transient session key (TSK1) may be generated as a function of the MSK1 and "other data" for establishing the communication session between the access terminal and the access point 232. The "other data" may be a quantity, static or time-varying, that is known to both the access terminal and the access point, or it may contain fresh generated quantities such as nonces that are exchanged subsequently in a separate protocol run for the purpose of deriving TSKs. Such protocols for deriving temporary session keys from a master key are known in the art. A communications session can then be securely established between the access point A 110 and the access terminal 118 using the first master session key MSK1 234.

The access terminal 118 may continue to listen for broadcasts from local access terminals 236 to determine whether a handoff should occur with a new access point B (e.g. Target evolved node B eNB)) 238. That is, as the access terminal 118 roams or moves into a different sector or cell, or a stronger signal is detected from another access point, a handoff to a new access point B 112 may be desirable. If a handoff from a current access point A 110 to the new access point B 112 is decided by the access terminal 118, it may send a short request to establish a communication session with Access Point B by handing off the communication session to Access Point B 112. Unlike the prior art, the short request does not include the access point identifier (AP_ID_B) 240. As a result of not including the access point identifier (AP_ID_B) in the request, the amount of data transmitted is minimized. Access point B may then send its identifier (AP_ID_B) and the access terminal identifier (AT_ID), in the form of a key request, to the authenticator for generating a master session key which may be used by the access terminal and access point B to establish a secure communication 242.

Next, both the authenticator 120 and the access terminal 118 may independently generate a new master session key MSK2 based, at least partially, on the current master transient key MTK, the access point identifier and the access terminal identifier 246 and 248. The master session keys (MSKs) may be short-term, link-specific keys. The authenticator 120 may then send the new master session key MSK2 to the new access point B 250. The secure communication session may then continue between the access point B 112 and the access terminal 118 using the new master session key MSK2 252.

A communications session can then be securely established between the access point B 112 and the access terminal 118 using the second master session key MSK2. The handoff may occur by the access point B responding to the handoff request directly to the access terminal. In an alternative embodiment, the handoff may occur by the access point B responding to the handoff request to the access terminal through the access point B 256. Following the derivation of a second master session key (MSK2), a second transient session key (TSK2) may be generated as a function of the MSK2 and "other data" for establishing the communication session between the access terminal and the access point 258. The "other data" may be a quantity, static or time-varying, that is known to both the access terminal and the access point, or it may contain fresh generated quantities such as nonces that are exchanged subsequently in a separate protocol run for the purpose of deriving TSKs. Such protocols for deriving temporary session keys from a master key are known in the art. Consequently, communications between the access terminal 118 and the access point A 110 may be terminated 260.

The process of securely handing off a communication session from one access point to another may be repeated multiple times. For example, in FIG. 1, the access terminal 118 may roam or move from a current cell 104 to a new cell 106 and seek to handoff a communication session from a current access point B 112 to a new access point C 114. The access terminal 118 may request a handoff to the new access point. As described above, the access terminal may send a short request for handoff, where the handoff request does not include the access point identifier (AP_ID). The authenticator 120 may then generate a new master session key MSK3 based (at least partially) on the master transient key MTK, the access point identifier and the access terminal identifier. The authenticator 120 may then send the master session key MSK3 to the new access point C 114. Both the authenticator 120 and the access terminal 118 may independently generate its own version of the new master session key MSK3. The access terminal 118 and new access point C 114 may then use the new master session key MSK3 to continue the secure communication session between them.

Figure 3A:
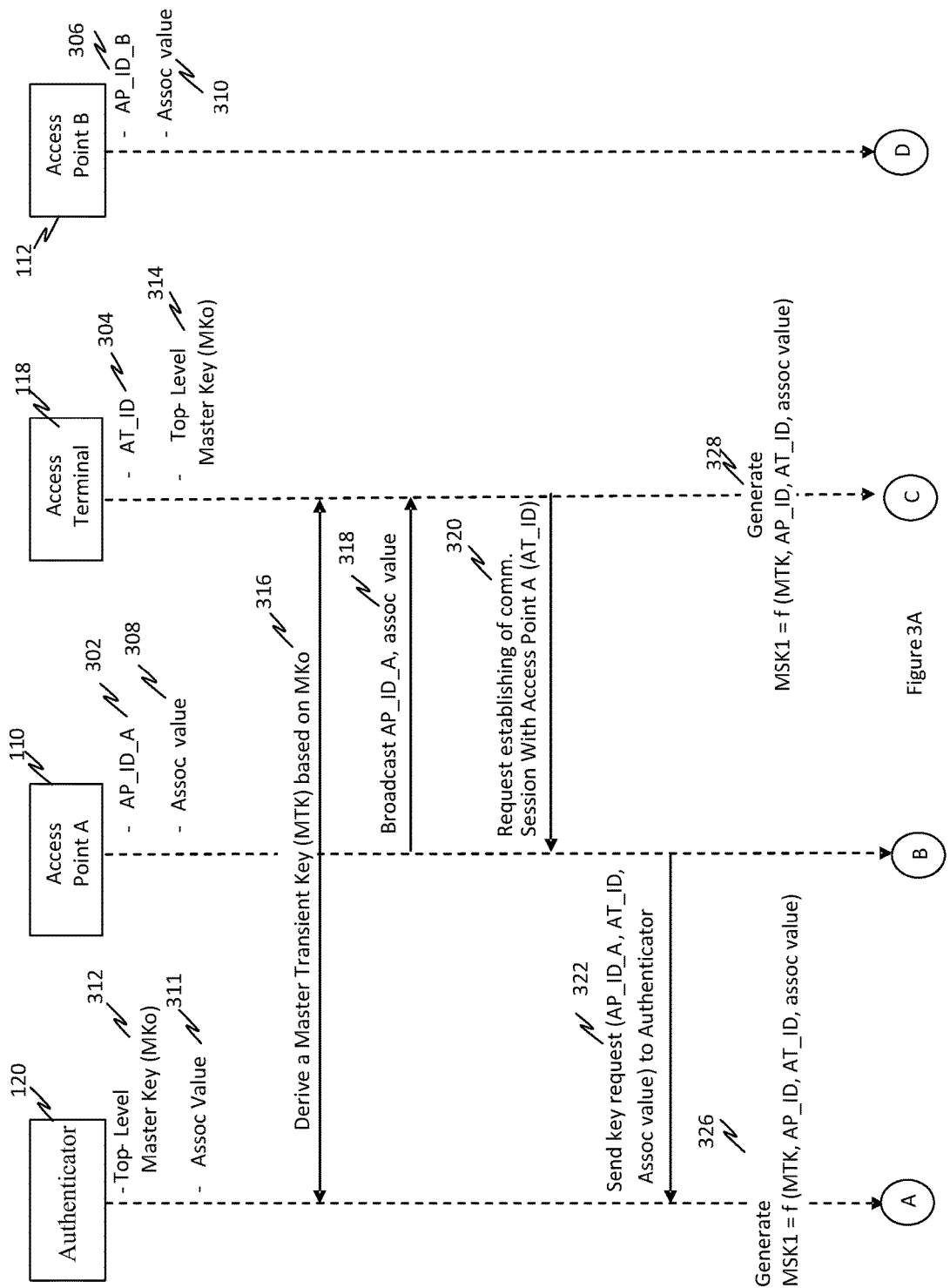
FIG. 3 (comprising FIGS. 3A, 3B and 3C) is a flow diagram illustrating a second example of the operation of a wireless communication system with centralized key management that facilitates secure, low-latency handoffs.
Figure 3B:
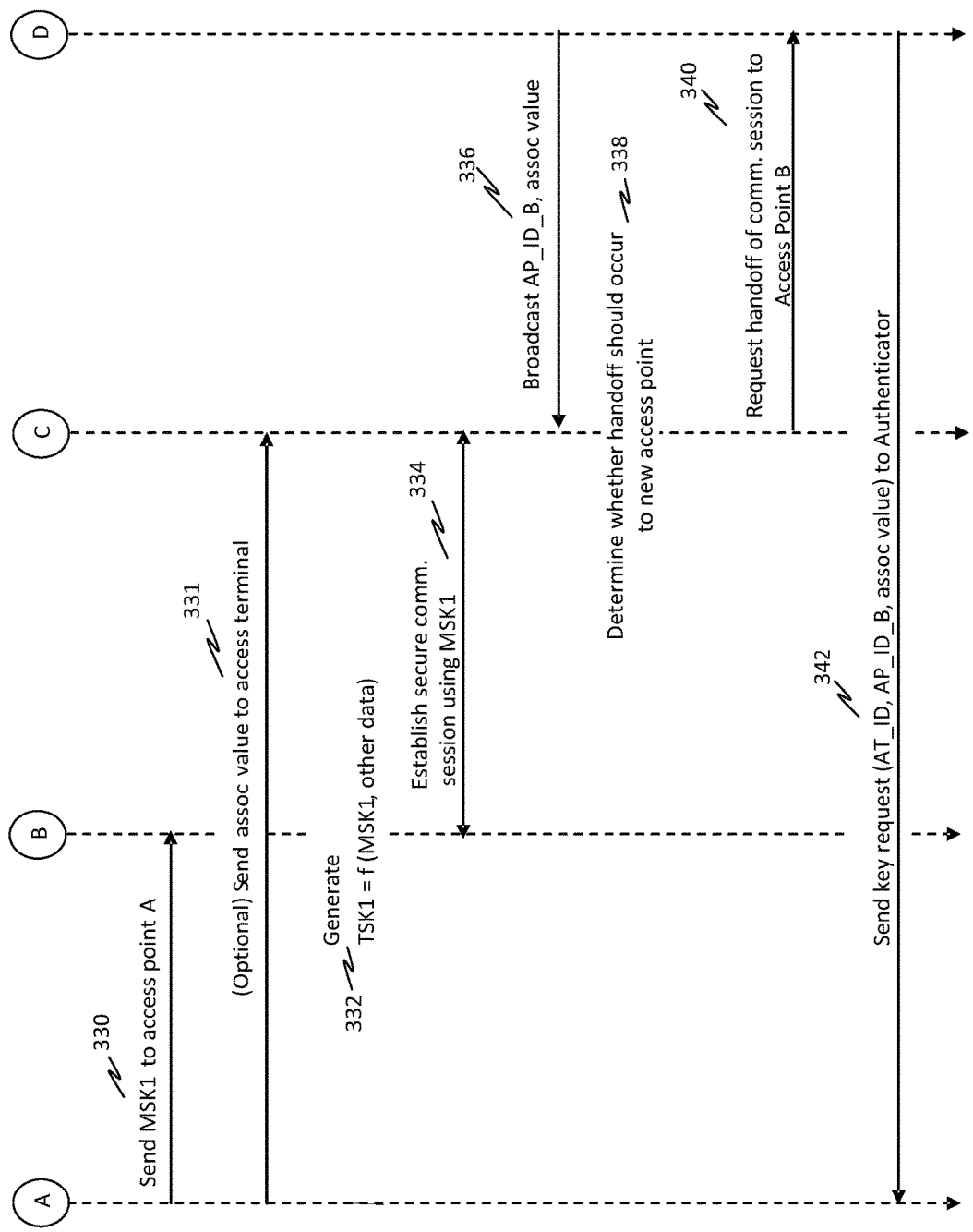
Figure 3C:
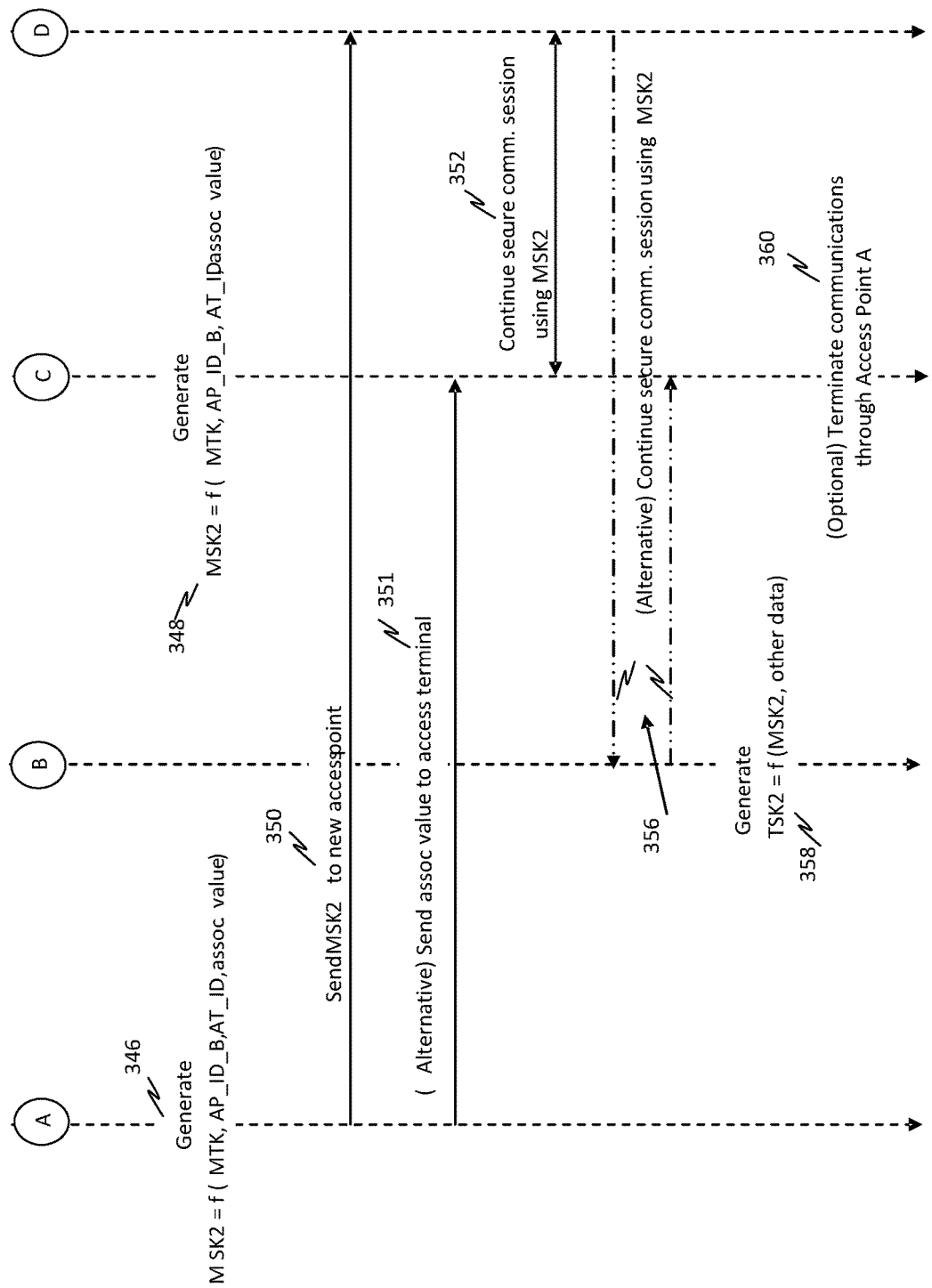

FIG. 3 (comprising FIGS. 3A, 3B and 3C) is a flow diagram illustrating a second example of the operation of a wireless communication system with centralized key management that facilitates secure, low-latency handoffs. In this second example, a master session key (MSK), as described below, may be generated based at least on a master transient key (MTK), an access point identifier, an access terminal identifier and optionally an associated value, where the value may be a nonce (or random number) generated by the access point or the authenticator. Also in this second example, the authenticator 120, access point A 110, access terminal 118, and access point B 112 of FIG. 1 are used for illustration purposes. Access point A may be identified by identifier AP_ID_A 302, access terminal may be identified by identifier AT_ID 304 and access point B may be identified by identifier AP_ID_B 306. Furthermore, access point A, access point B and the authenticator may each store a value 308, 310 and 311 which may be a random number or a nonce generated by each access point and the authenticator, respectively.

The authenticator 120 and access terminal 118 may each store a top-level master key MKo 312 and 314 uniquely associated with the access terminal 118. The authenticator 120 and access terminal 118 may also negotiate a master transient key (MTK) (and possibly an MTK identifier MTK_ID) via a prescribed protocol, such as EAP. The MTK may be based (at least partially) on the top-level master key MKo and/or the access terminal identifier (AT_ID) 316. The MTK may be securely maintained by the authenticator 120 and access terminal 118. In contrast, the MSK that an access terminal 118 and an access point 110 share are derived from the MTK and are master keys that may be subsequently used to derive temporary session keys.

In some implementations, the MTK derivation may also include a random number generated and/or supplied by the access terminal 118 and/or authenticator 120. As such, a protocol may be implemented between the authenticator 120 and/or access terminal 118 to derive, generate, and/or exchange such random number prior to (or concurrent with) derivation of the MTK. As it is known in the art, many instances of the EAP exhibit such an approach.

The access terminal 118 may listen for broadcasts identifying local access points for obtaining the access point identifier and optionally the access point's associated value 318. In one example, the access terminal 118 may select an access point A 110 based on its signal strength in comparison to any other access points in the vicinity. The access terminal 118 may send a short request to establish a communication session with Access Point A 110. Unlike the prior art, the short request may not include the access point identifier (AP_ID_A), and may include only the access terminal identifier 320. This minimizes the amount of data that is transmitted. Access point A may then send its identifier (AP_ID_A), the access terminal identifier (AT_ID) and optionally its associated value, in the form of a key request, to the authenticator for generating a first master session key (MSK1) which may be used by the access terminal and access point A to establish a secure communication 322. The value may be an IP or MAC address associated with or assigned to the access point or a nonce or random number chosen by the access point.

Next, both the authenticator 120 and access terminal 118 may independently generate a first master session key MSK1 based, at least partially, on the master transient key (MTK), the access point identifier, the access terminal identifier and optionally the associated value 326 and 328. The master session keys (MSKs) may be short-term, link-specific keys. A master session key MSKn may be generated using a pseudo-random function (PRF) or other suitable key derivation function. Because the master session keys MSKs are generated using a common MTK, at least the access point identifiers AP_IDs or another associated value used in the derivation of each MSK should be unique to a particular access point and access terminal pair. The authenticator 120 may then send the first master session key MSK1 to the access point A 330. If the authenticator uses its associated value, the authenticator may send its value to the access terminal so that the access terminal may generate the same first master session key (MSK1) 331. Following the derivation of a first master session key (MSK1), a first transient session key (TSK1) may be generated as a function of the MSK1 and "other data" for establishing the communication session between the access terminal and the access point 332. The "other data" may be a quantity, static or time-varying, that is known to both the access terminal and the access point, or it may contain fresh generated quantities such as nonces that are exchanged subsequently in a separate protocol run for the purpose of deriving TSKs. Such protocols for deriving temporary session keys from a master key are known in the art. A communications session can then be securely established between the access point A 110 and the access terminal 118 using the first master session key MSK1 334.

The access terminal 118 may continue to listen for broadcasts from local access terminals for obtaining the access point identifier and optionally the access point's associated value 336 and to determine whether a handoff should occur with a new access point B 338. That is, as the access terminal 118 roams or moves into a different sector or cell, or a stronger signal is detected from another access point, a handoff to a new access point B 112 may be desirable. If a handoff from a current access point A 110 to the new access point B 112 is decided by the access terminal 118, it may send a short request to establish a communication session with Access Point B by handing off the communication session to Access Point B 112. Unlike the prior art, the short request does not include the access point identifier (AP_ID_B) 340. As a result of not including the access point identifier (AP_ID_B) in the request, the amount of data transmitted is minimized.

Access point B may then send its identifier (AP_ID_B), the access terminal identifier (AT_ID) and optionally its associated value, in the form of a key request, to the authenticator for generating a second master session key (MSK2) which may be used by the access terminal and access point B to establish a secure communication 342. The associated value may be an IP or MAC address associated with or assigned to the access point or a nonce or random number chosen by the access point.

Next, both the authenticator 120 and the access terminal 118 may independently generate a new master session key MSK2 based, at least partially, on the current master transient key MTK, the access point identifier, the access terminal identifier and optionally the associated value 346 and 348. The associated value may be an IP or MAC address associated with or assigned to an access point, a nonce or random number chosen by the access point or the authenticator. The master session keys (MSKs) may be short-term, link-specific keys. A master session key MSKn may be generated using a pseudo-random function (PRF) or other suitable key derivation function. Because the master session keys MSKs are generated using a common MTK, at least the access point identifiers AP_IDs, access terminal identifiers and/or another associated value used in the derivation of each MSK should be unique to a particular access point and access terminal pair. The authenticator 120 may then send the second master session key MSK2 to the access point A 350. If the authenticator uses its associated value, the authenticator may send its associated value to the access terminal so that the access terminal may generate the same second master session key (MSK2) 351. The secure communication session may then continue between the access point B 112 and the access terminal 118 using the new master session key MSK2 352.

A communications session can then be securely established between the access point B 112 and the access terminal 118 using the second master session key MSK2. The handoff may occur by the access point B responding to the handoff request directly to the access terminal. In an alternative embodiment, the handoff may occur by the access point B responding to the handoff request to the access terminal through the access point B 356. Following the derivation of a second master session key (MSK2), a second transient session key (TSK2) may be generated as a function of the MSK2 and "other data" for establishing the communication session between the access terminal and the access point 358. The "other data" may be a quantity, static or time-varying, that is known to both the access terminal and the access point, or it may contain fresh generated quantities such as nonces that are exchanged subsequently in a separate protocol run for the purpose of deriving TSKs. Such protocols for deriving temporary session keys from a master key are known in the art. Consequently, communications between the access terminal 118 and the access point A 110 may be terminated 360.

The process of securely handing off a communication session from one access point to another may be repeated multiple times. For example, in FIG. 1, the access terminal 118 may roam or move from a current cell 104 to a new cell 106 and seek to handoff a communication session from a current access point B 112 to a new access point C 114. The access terminal 118 may request a handoff to the new access point. As described above, the access terminal may send a short request for handoff, where the handoff request does not include the access point identifier (AP_ID). The authenticator 120 may then generate a new master session key MSK3 based (at least partially) on the master transient key MTK, the access point identifier, the access terminal identifier and optionally an associated value. The associated value may be an IP or MAC address associated with or assigned to the access point or a nonce or random number chosen by the access point or the authenticator. The authenticator 120 may then send the master session key MSK3 to the new access point C 114. As described above, if the authenticator's associated value is used, the authenticator may send its value to the access terminal so that it may generate the same master session key. Both the authenticator 120 and the access terminal 118 may independently generate its own version of the new master session key MSK3. The access terminal 118 and new access point C 114 may then use the new master session key MSK3 to continue the secure communication session between them.

Figure 4:
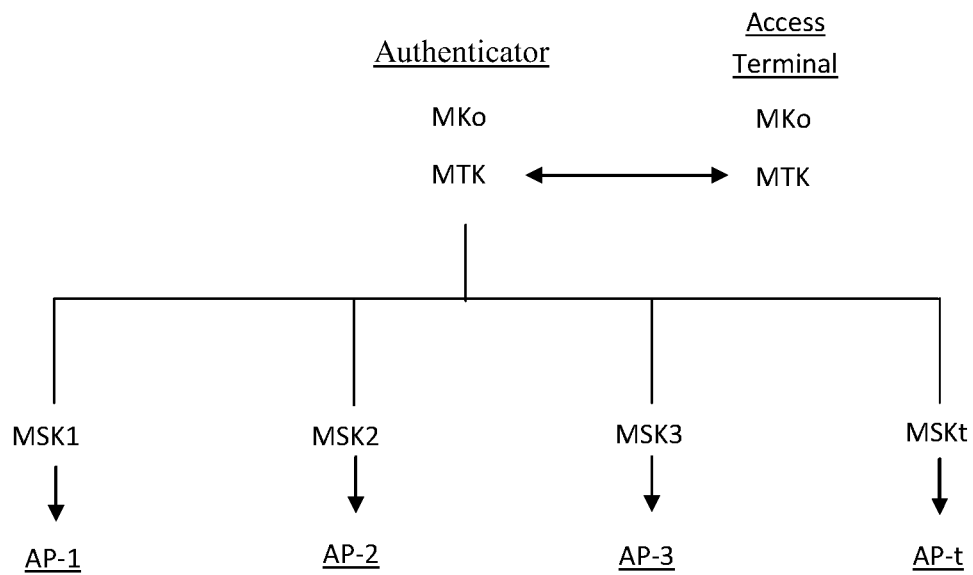
FIG. 4 illustrates a centralized model of security keys that may be used in securing communication sessions between an access terminal and a new access point during and/or after handoff.

FIG. 4 illustrates a centralized model of security keys that may be used in securing communication sessions between an access terminal and a new access point during and/or after handoff. In this centralized model, the authenticator (e.g., network controller, authentication server, etc.) and access terminal negotiate a master transient key (MTK) based on (at least partially) a top-level master key MKo uniquely associated with the access terminal. The authenticator generates, administers and/or distributes transient session keys to each access point. Because the transient master key MTK is negotiated just once (e.g., when the access terminal and authenticator first initiate communications), this speeds up the process of generating session keys. Also, even if the transient master key MTK is compromised, it does not compromise the top-level master key MKo. Moreover, because neither the top-level master key MKo or master transient key MTK are distributed to the access points (e.g., just the transient session keys are distributed), it reduces the risk of compromising security if an access point was compromised.

This centralized key management provides a low-latency handoff for an existing communication session since the master session keys are generated and provided by the authenticator while securing communication sessions since neither the top-level master key MKo nor master transient key MTK are distributed to the access points.

In various implementations, the new master session key MSKt may be used for a short time after handoff, or it may be used indefinitely, to secure communications between the access terminal and the new access point AP-t. In some applications, EAP authentication or re-authentication of an access terminal via an access point may be subsequently performed (e.g., to renew the MTK) in order to reduce the potential of compromising the communication session.

As used in FIGS. 1-4 and the description herein, the master transient key (MTK) and master session keys (MSKs) may be specific to a particular access point/access terminal pair. The MTK is used between the authenticator (which may also be an access point) and the access terminal. The MSK is used between an access point and an access terminal. In some implementations, the master transient key (MTK) and master session keys (MSKs) may be used for a short period of time (until a secure key is negotiated between an access terminal and access point) or a prolonged period of time (e.g., until the communication session is handed off to another access point or the communication session ends). In other implementations, the MSKs may be used as root keys to derive transient session keys (TSKs) via a prescribed protocol undertaken between the access point and the access terminal.

While the examples illustrated in FIGS. 1-4 often refer to implementing the centralized key management schemes in the context of handing off communications from a current access point to a new access point, it may be implemented in other contexts. In one example, rather than obtaining or negotiating new keys when an access terminal moves to a new access point, an active set of keys is maintained by the access terminal. That is, the access terminal may simultaneously or concurrently establish security associations (e.g., keys) with a plurality of access points within a sector, area, or region. The access points with which the access terminal maintains such simultaneous or concurrent security associations (e.g., keys) are referred to an "active set" of access points. Each time a new access point is added to the active set of an access terminal, the access terminal and new access point may establish a secure key. For example, the access terminal and new access point may establish a master session key (MSK).

Where a centralized key management method is implemented in the context of an active set of access points, the access terminal may simply derive a new master session key (MSK) with the authenticator for the new access point and has the authenticator provide it to the new access point.

Using an active set of access points with a centralized key management method, as described above, enables the access terminal to quickly switch communications with access points in its active set.

Figure 5:
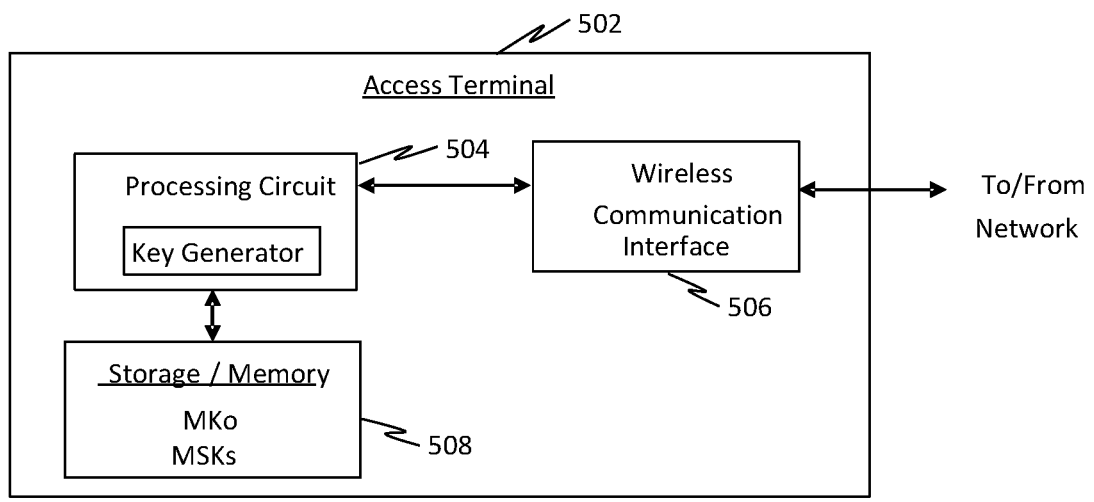
FIG. 5 is a block diagram illustrating an access terminal configured to perform low-latency secure communication session handoffs.

FIG. 5 is a block diagram illustrating an access terminal configured to perform low-latency secure communication session handoffs. The access terminal 502 may include a processing circuit 404 coupled to a wireless communication interface 506 to communicate over a wireless network and a storage device 508 to store a unique top-level master key MKo (associated with the access terminal) and the MSKs associated with each access point. The processing circuit 504 may be configured to securely handoff an ongoing communication session without noticeable interruptions in the communication session. The processing circuit 504 (e.g., processor, processing module, etc.) may include a key generator module configured to generate one or more keys that can be used to secure a communication session.

Figure 6:
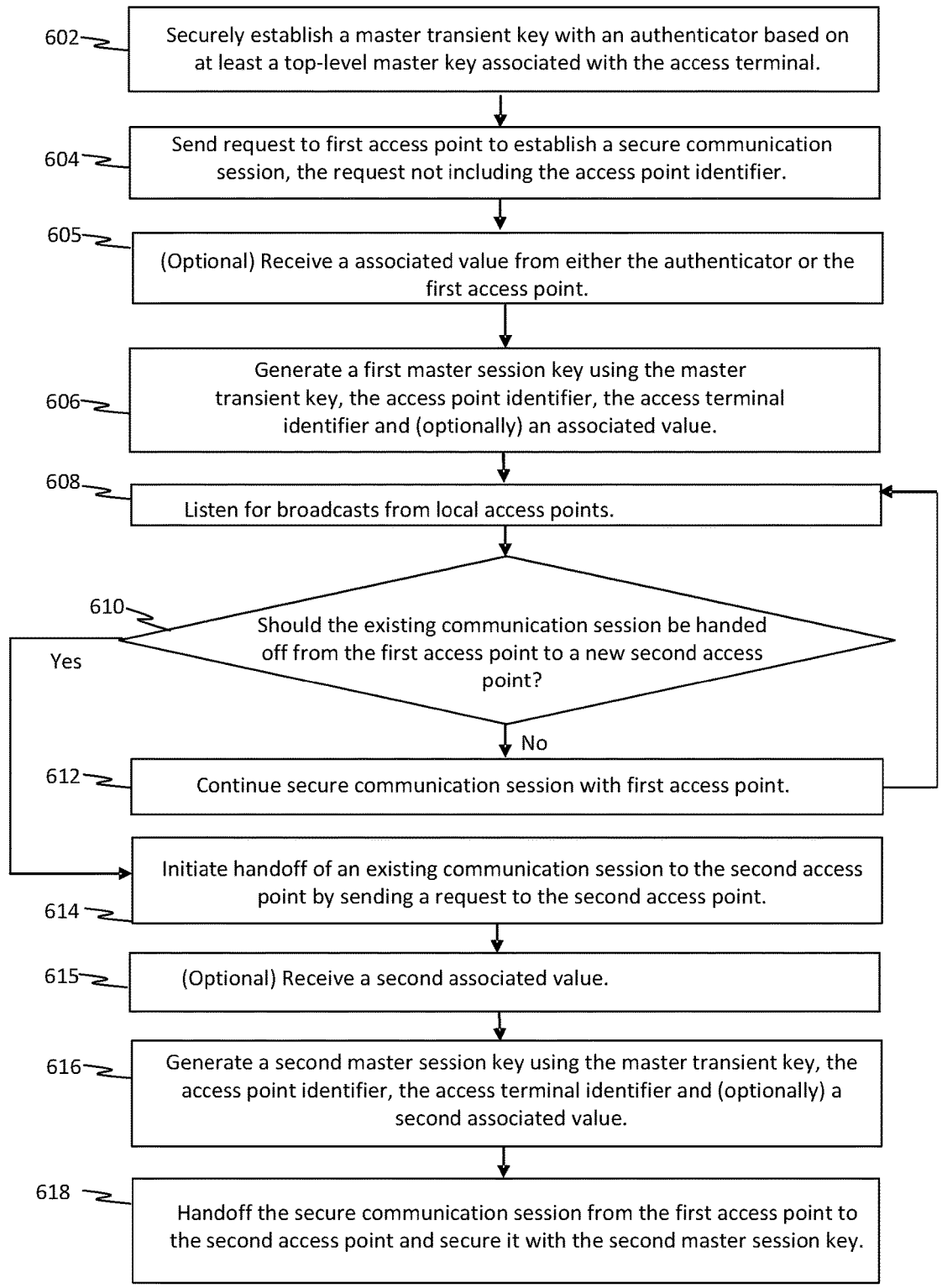
FIG. 6 is a flow diagram illustrating a method operational in an access terminal to facilitate a secure communication session handoff from a first access point to a new access point using a centralized key management approach.

FIG. 6 is a flow diagram illustrating a method operational in an access terminal to facilitate a secure communication session handoff from a first access point to a new or second access point using a centralized key management approach. Initially, a master transient key (MTK) may be securely established with an authenticator based on at least a top-level master key associated with the access terminal 602. A short request to establish a secure communication session with a first access point may be sent to the first access point 604. The short request may include the access terminal identifier only and not the access point identifier to minimize the amount of data that may be transmitted.

Optionally, as described above, an associated value may be received from the authenticator or the access point 605. The associated value may be an IP or MAC address associated with or assigned to an access point or a nonce or random number chosen by the access point or the authenticator. The secure communication session may be established with the first access point using at least a unique first master session key generated based on the master transient key, the access point identifier, the access terminal identifier and optionally the associated value 606.

The access terminal may then listen for broadcasts from local access points 608. If a second access point is identified, the access terminal determines whether the existing communication session should be handed off from the first access point to the second access point 610. This may be determined by comparing the signal strength and/or quality with the first access point and second access point. The access terminal may determine to continue the communication session with the first access point 612. Otherwise, the access terminal may choose to initiate handoff of the existing communication session to the second access point by sending a short request to the second access point without including the second access point identifier 614. As described above, the short request may include the access terminal identifier only and not the access point identifier to minimize the amount of data that may be transmitted.

Optionally, as described above, a second associated value may be received from the authenticator or the access point 615. The associated value may be an IP or MAC address associated with or assigned to the access point or a nonce or random number chosen by the access point or the authenticator. The secure communication session may be established with the second access point using at least a unique second master session key generated based on the master transient key, the access point identifier, the access terminal identifier and optionally the second associated value 616.

The access terminal may then hand off the secure communication session from the first access point to the second access point and secure it with the second master session key 618. This handoff process may be repeated multiple times by using the master transient key, the access point identifier, the access terminal identifier and optionally a new associated value to generate the next master session key.

Figure 7:
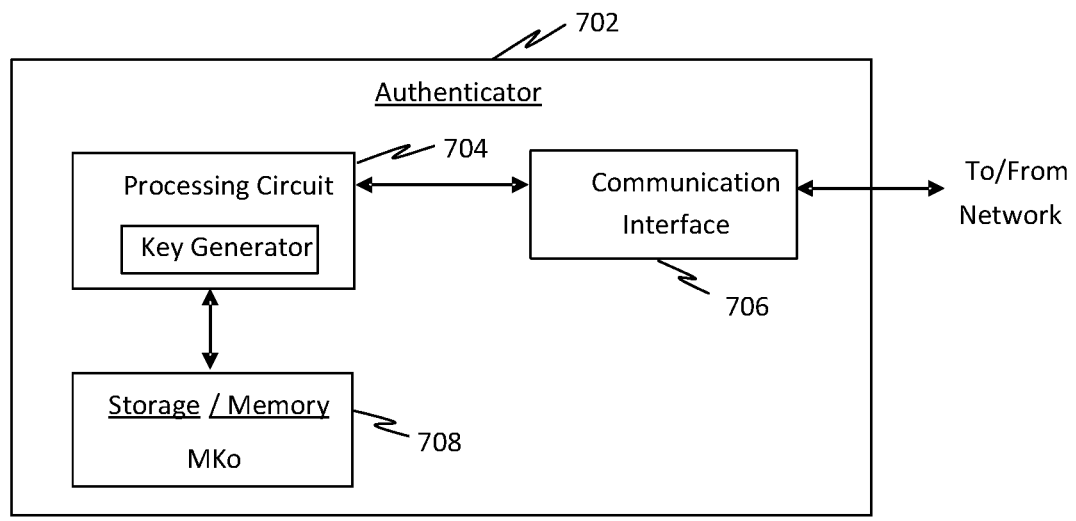
FIG. 7 is a block diagram illustrating an authenticator configured to facilitate low-latency secure communication session handoffs.

FIG. 7 is a block diagram illustrating an authenticator configured to facilitate low-latency secure communication session handoffs. The authenticator 702 may include a processing circuit 704 coupled to a communication interface 706 to communicate over a network and a storage device 708 to store a unique top-level master key MKo (associated with an access terminal). The processing circuit 704 may be configured to facilitate a secure handoff of an ongoing communication session from an access point to an access terminal without noticeable interruptions in the communication session. The processing circuit 704 (e.g., processor, processing module, etc.) may include a key generator module configured to generate one or more keys that can be used to secure a communication session. In various applications, the authenticator 702 may be a located at a network controller or it may be co-located with one or more access points.

Figure 8:
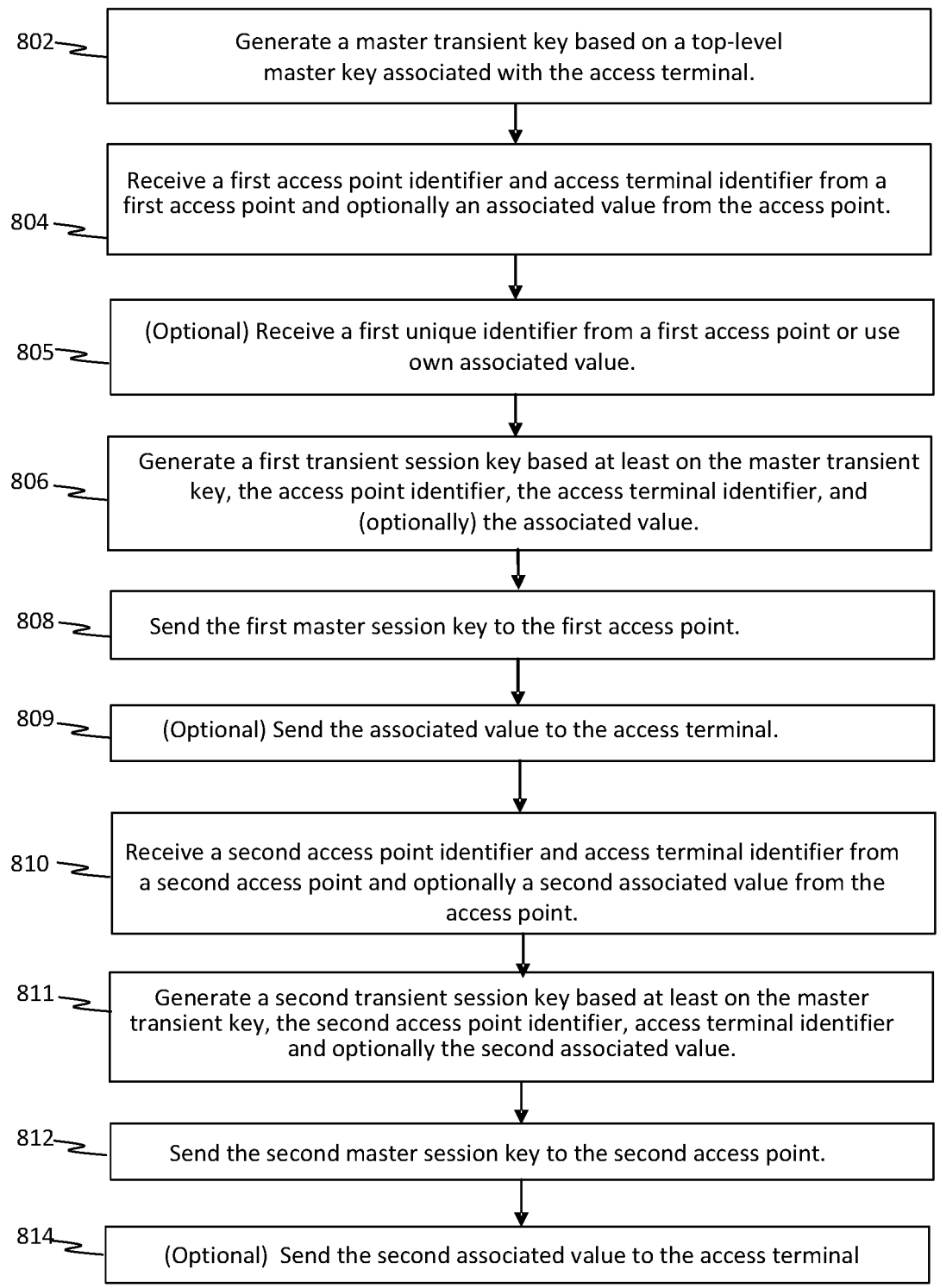
FIG. 8 is a flow diagram illustrating a method operational in an authenticator to facilitate a secure communication session handoff from a first access point to a new access point using a centralized key management approach.

FIG. 8 is a flow diagram illustrating a method operational in an authenticator to facilitate a secure communication session handoff from a first access point to a new access point using a centralized key management approach. The authenticator generates a master transient key (MTK) based on a top-level master key associated with the access terminal upon the access terminal requesting a communication session with a first access point 802. A first access point identifier (AP_ID_A), an access terminal identifier 804 and optionally, as described above, an associated value may be received from the access point. In an alternative embodiment, if an associated value is used, the authenticator may use its own associated value as described above 805. The associated value may be an IP or MAC address associated with or assigned to the access point or a nonce or random number chosen by the access point or the authenticator.

A first master session key is generated by the authenticator based at least on the master transient key, the access point identifier, access terminal identifier and optionally the associated value 806. The first master session key may be sent by the authenticator to the first access point 808. Optionally, if the authenticator's associated value is used in generating the master session key, the authenticator may send its associated value to the access terminal so that the access terminal may generate the same first master session key 809.

Subsequently, a second access point identifier, access terminal identifier and optionally, as described above, a second associated value may be received from the second access point. In an alternative embodiment, if a second associated value is used, the authenticator may use its own associated value 810. The second associated value may be an IP or MAC address associated with or assigned to the access point or a nonce or random number chosen by the access point or the authenticator.

A second master session key is generated based at least on the master transient key, the second access point identifier, the access terminal identifier and optionally the second associated value 811. The authenticator may then send the second master session key to the second access point 812. Optionally, if the authenticator's associated value is used, the authenticator may send its associated value to the access terminal so that the access terminal may generate the same second master session key 814.

Figure 9:
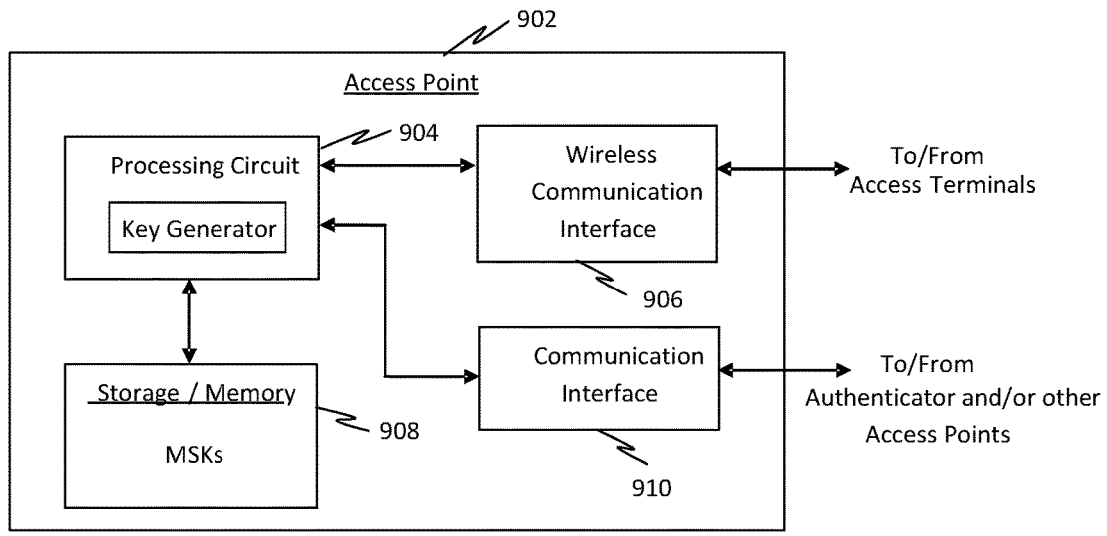
FIG. 9 is a block diagram illustrating an access point configured to facilitate low-latency secure communication session handoffs.

FIG. 9 is a block diagram illustrating an access point configured to facilitate low-latency secure communication session handoffs. The access point 902 may include a processing circuit 904 coupled to a wireless communication interface 906 to communicate with one or more access terminals, a communication interface 910 to communicate with an authenticator and/or other access points, and a storage device 908 to store a unique top-level master key MKo (associated with an access terminal). The processing circuit 904 may be configured to facilitate a secure handoff of an ongoing communication session from the access point 902 to an access terminal without noticeable interruptions in the communication session. The processing circuit 904 (e.g., processor, processing module, etc.) may include a key generator module configured to generate one or more keys that can be used to secure a communication session.

Figure 10:
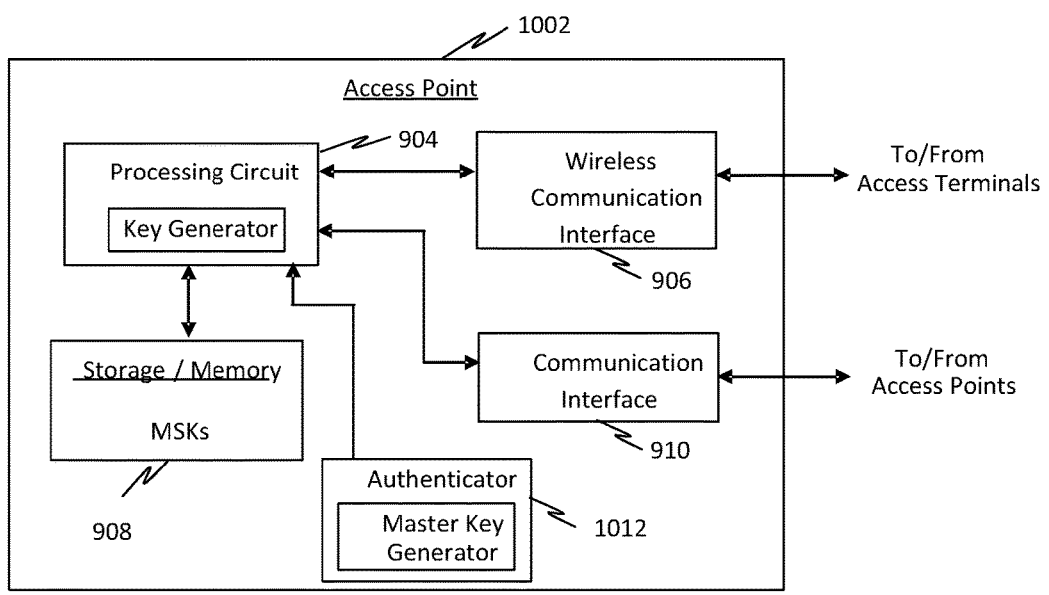
FIG. 10 is a block diagram illustrating an alternative embodiment of an access point having an integrated authenticator

FIG. 10 is a block diagram illustrating an alternative embodiment of an access point 1002 having an integrated authenticator. The access point 1002 may include many of the same components as the access point 1002 in FIG. 9 but instead of communicating with an authenticator via its communication interface 910, the authenticator 1012 is co-located with the access point 902. The authenticator 1012 and access point 1002 may operate as illustrated in FIGS. 1-8 and 11-12.

Figure 11:
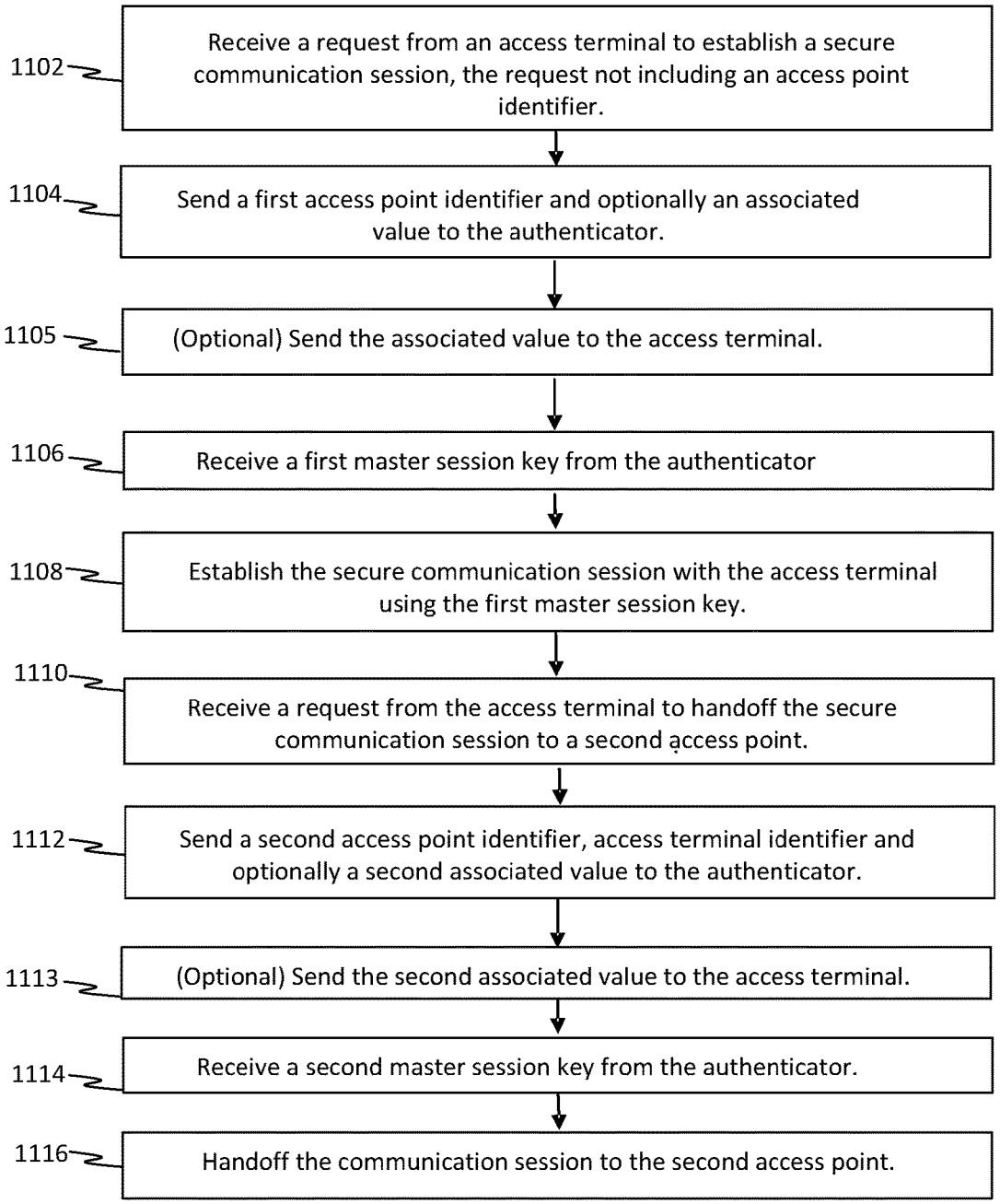
FIG. 11 is a flow diagram illustrating a method operational in a first access point to facilitate a secure communication session handoff from the first access point to a second access point using a centralized key management approach.

FIG. 11 is a flow diagram illustrating a method operational in a first access point to facilitate a secure communication session handoff from the first access point to a second access point using a centralized key management approach. The first access point receives a request from an access terminal to establish a secure communication session; the request does not include an access point identifier 1102. Upon receiving the request, the access point may send a first access point identifier and optionally a associated value to the authenticator 1104. Optionally, it may then send the associated value to the access terminal so that the access terminal may generate the same master session key 1105. In an alternative embodiment, if an associated value is used to generate the master session keys, the authenticator may use its own associated value and send it to the access terminal to generate the same master session key.

The access point then receives the first master session key from the authenticator 1106. The first access point can then establish the secure communication session with the access terminal using the first master session key 1108. Subsequently, the first access point may receive a request from the access terminal to handoff the secure communication session to a second access point; the request does not include an access point identifier 1110. This may cause the second access point to send a second access point identifier, the access terminal identifier and optionally a second associated value to the authenticator 1112. It may then send the second associated value to the access terminal so that the access terminal may generate the same master session key 1113. In an alternative embodiment, if an associated value is used to generate the master session keys, the authenticator may use its own associated value and send it to the access terminal to generate the same master session key. The access point may then receive the second master session key from the authenticator 1114. The communication session can then be handed of to the second access point 1116.

Figure 12:
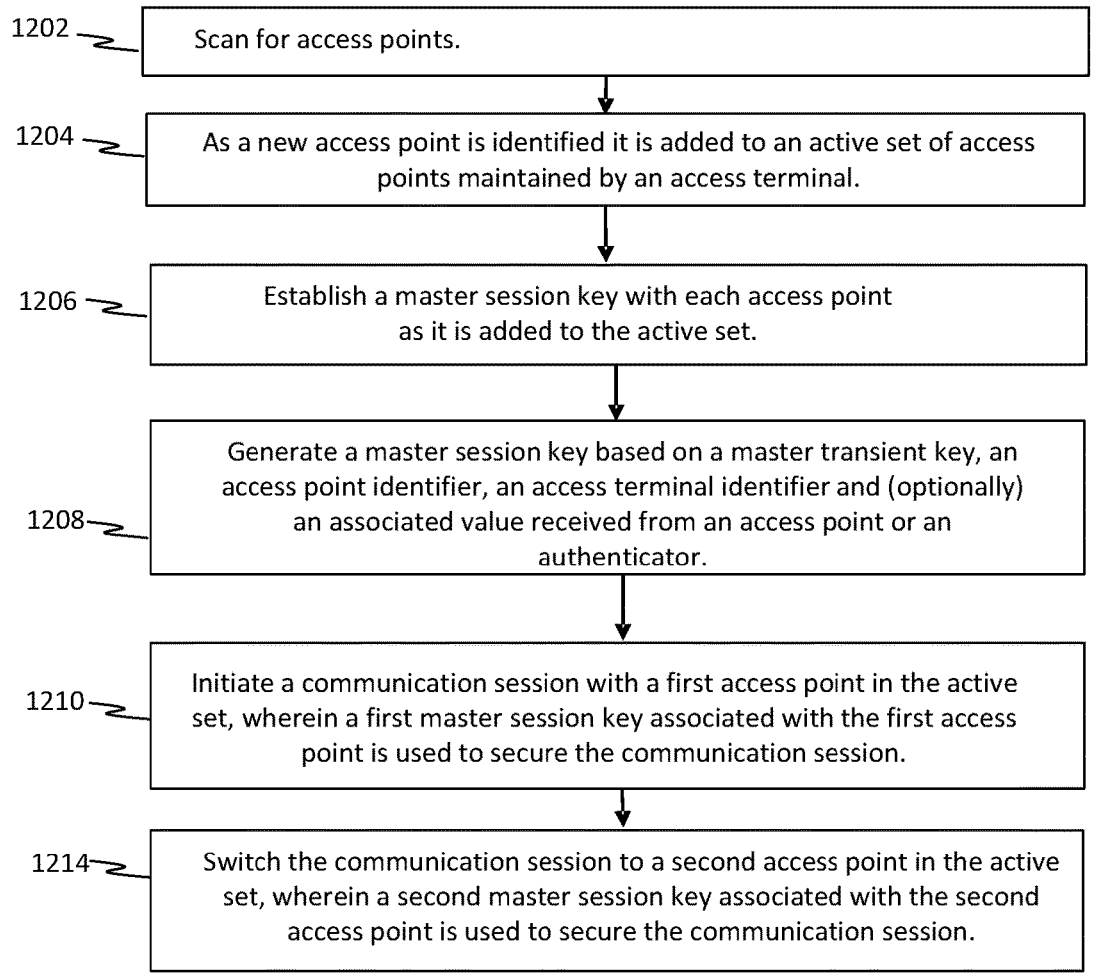
FIG. 12 is a flow diagram illustrating a method operational in an access terminal to obtain and/or establish an active set of access points.

FIG. 12 is a flow diagram illustrating a method operational in an access terminal to obtain and/or establish an active set of access points. The access terminal may scan for access points 1202. As a new access point is identified, the access terminal adds it to its active set of access points 1204. The access terminal may establish a master session key with each access point as it is added to the active set 1206.

The master session key for each access point may include a master session key based on a master transient key, an access point identifier, an access terminal identifier and optionally an associated value received from an access point or an authenticator 1208. As described above, the associated value may be from the access point or the authenticator and may be an IP or MAC address associated with or assigned to the access point or a nonce or random number chosen by the access point. Such master session key may have been generated as illustrated in FIGS. 1-4 and/or 6, for example.

The access terminal may initiate a communication session with a first access point in the active set, wherein a first master session key associated with the first access point is used to secure the communication session 1210. The access point may subsequently switch the communication session to a second access point in the active set, wherein a second master session key associated with the second access point is used to secure the communication session 1212. Even after the access terminal switches from the first to the second access point, the first master session key may be subsequently reused if the access terminal switches back to communicating with the first access point.

One or more of the components, steps, and/or functions illustrated in FIGS. 1, 2, 3, 4, 5, 6, 7, 8, 9, 10, 11 and/or 12 may be rearranged and/or combined into a single component, step, or function or embodied in several components, steps, or functions without affecting the operation of the pseudo-random number generation. Additional elements, components, steps, and/or functions may also be added without departing from the application. The apparatus, devices, and/or components illustrated in FIGS. 1, 5, 7, 9, and/or 10 may be configured to perform one or more of the methods, features, or steps described in FIGS. 2, 3, 4, 6, 8, 11 and/or 12. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the application described herein can be implemented in different systems without departing from the application. For example, some implementations of the application may be performed with a moving or static communication device (e.g., access terminal) and a plurality of mobile or static base stations (e.g., access points).

It should be noted that the foregoing embodiments are merely examples and are not to be construed as limiting the application. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A method of wireless communication at an access terminal, comprising:
deriving a master transient key based on a master key and an identifier;
establishing a secure communication session with a first access point based on a first master session key that is based on the master transient key;
obtaining a second access point identifier associated with a second access point;
sending a message to at least one of the first access point or the second access point, the message being associated with a handoff of the secure communication session to the second access point;
generating a second master session key based on at least the master transient key and the second access point identifier, wherein the second master session key is different than the first master session key, wherein the second master session key is used for secure communications with the second access point in connection with an intra-authenticator handoff from the first access point to the second access point associated with a same authenticator in a cellular network; and
moving, in a handoff, the secure communication session to the second access point, wherein the second master session key is used in the secure communication session with the second access point.

2. The method of claim 1, wherein the same authenticator comprises a same mobility management entity (MME) in the cellular network.

3. The method of claim 1, further comprising:
generating the first master session key based on the master transient key,
wherein the secure communication session with the first access point is established using the first master session key.

4. The method of claim 1, wherein the master transient key is generated based on a top-level master key associated with the access terminal.

5. The method of claim 1, wherein the master transient key is based on an access terminal identifier.

6. The method of claim 1, wherein the second master session key corresponds to a third master session key at the second access point generated independently from the second master session key at the access terminal.

7. The method of claim 1, wherein the message is sent prior to generating the second master session key.

8. The method of claim 1, wherein the access terminal first communicates with the second access point using the second master session key after the second access point receives the second master session key from a separate source.

9. An apparatus for wireless communication at a wireless terminal, comprising:
means for deriving a master transient key based on a master key and an identifier;
means for establishing a secure communication session with a first access point based on a first master session key that is based on the master transient key;
means for obtaining a second access point identifier associated with a second access point;
means for sending a message to at least one of the first access point or the second access point, the message being associated with a handoff of the secure communication session to the second access point;
means for generating a second master session key based on at least the master transient key and the second access point identifier, wherein the second master session key is different than the first master session key, wherein the second master session key is used for secure communications with the second access point in connection with an intra-authenticator handoff from the first access point to the second access point associated with a same authenticator in a cellular network; and
means for moving, in a handoff, the secure communication session to the second access point, wherein the second master session key is used in the secure communication session with the second access point.

10. The apparatus of claim 9, wherein the same authenticator comprises a same mobility management entity (MME) in the cellular network.

11. The apparatus of claim 9, further comprising:
means for generating the first master session key based on the master transient key,
wherein the secure communication session with the first access point is established using the first master session key.

12. The apparatus of claim 9, wherein the master transient key is generated based on a top-level master key associated with the access terminal.

13. The apparatus of claim 9, wherein the master transient key is based on an access terminal identifier.

14. The apparatus of claim 9, wherein the second master session key corresponds to a third master session key at the second access point generated independently from the second master session key at the access terminal.

15. The apparatus of claim 9, wherein the message is sent prior to generating the second master session key.

16. The apparatus of claim 9, wherein the access terminal first communicates with the second access point using the second master session key after the second access point receives the second master session key from a separate source.

17. An apparatus for wireless communication at a wireless terminal, comprising:
a memory; and at least one processor coupled to the memory and configured to cause the apparatus to:
    derive a master transient key based on a master key and an identifier;
    establish a secure communication session with a first access point based on a first master session key that is based on the master transient key;
    obtain a second access point identifier associated with a second access point;
    send a message to at least one of the first access point or the second access point, the message being associated with a handoff of the secure communication session to the second access point;
    generate a second master session key based on at least the master transient key and the second access point identifier, wherein the second master session key is different than the first master session key, wherein the second master session key is used for secure communications with the second access point in connection with an intra-authenticator handoff from the first access point to the second access point associated with a same authenticator in a cellular network; and
    move, in a handoff, the secure communication session to the second access point, wherein the second master session key is used in the secure communication session with the second access point.

18. The apparatus of claim 17, wherein the same authenticator comprises a same mobility management entity (MME) in the cellular network.

19. The apparatus of claim 17, wherein the at least one processor is further configured to cause the apparatus to:
    generate the first master session key based on the master transient key,
    wherein the secure communication session with the first access point is established using the first master session key.

20. The apparatus of claim 17, wherein the master transient key is generated based on a top-level master key associated with the access terminal.

21. The apparatus of claim 17, wherein the master transient key is based on an access terminal identifier.

22. The apparatus of claim 17, wherein the second master session key corresponds to a third master session key at the second access point generated independently from the second master session key at the access terminal.

23. The apparatus of claim 17, wherein the message is sent prior to generating the second master session key.

24. The apparatus of claim 17, wherein the access terminal first communicates with the second access point using the second master session key after the second access point receives the second master session key from a separate source.

25. A non-transitory computer-readable medium storing computer executable code for wireless communication at a wireless terminal, comprising code to:
    derive a master transient key based on a master key and an identifier;
    establish a secure communication session with a first access point based on a first master session key that is based on the master transient key;
    obtain a second access point identifier associated with a second access point;
    send a message to at least one of the first access point or the second access point, the message being associated with a handoff of the secure communication session to the second access point;
    generate a second master session key based on at least the master transient key and the second access point identifier, wherein the second master session key is different than the first master session key, wherein the second master session key is used for secure communications with the second access point in connection with an intra-authenticator hand off from the first access point to the second access point associated with a same authenticator in a cellular network; and
    move, in a handoff, the secure communication session to the second access point, wherein the second master session key is used in the secure communication session with the second access point.

26. The computer-readable medium of claim 25, wherein the same authenticator comprises a same mobility management entity (MME) in the cellular network.

27. The computer-readable medium of claim 25, further comprising code to:
    generate the first master session key based on the master transient key,
    wherein the secure communication session with the first access point is established using the first master session key.

28. The computer-readable medium of claim 25, wherein the master transient key is generated based on a top-level master key associated with the access terminal.

29. The computer-readable medium of claim 25, wherein the master transient key is based on an access terminal identifier.

30. The computer-readable medium of claim 25, wherein the second master session key corresponds to a third master session key at the second access point generated independently from the second master session key at the access terminal.

31. The computer-readable medium of claim 25, wherein the message is sent prior to generating the second master session key.

32. The computer-readable medium of claim 25, wherein the access terminal first communicates with the second access point using the second master session key after the second access point receives the second master session key from a separate source.

* * * * *